US012187047B2

(12) United States Patent
Watanabe et al.

(10) Patent No.: US 12,187,047 B2
(45) Date of Patent: Jan. 7, 2025

(54) FLOW PASSAGE MEMBER, LIQUID EJECTING HEAD, LIQUID EJECTING APPARATUS, AND METHOD FOR MANUFACTURING FLOW PASSAGE MEMBER

(71) Applicant: SEIKO EPSON CORPORATION, Tokyo (JP)

(72) Inventors: Eiichiro Watanabe, Matsumoto (JP); Hiroki Kobayashi, Matsumoto (JP); Shingo Tomimatsu, Shiojiri (JP); Katsuhiro Okubo, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 77 days.

(21) Appl. No.: 17/304,040

(22) Filed: Jun. 14, 2021

(65) Prior Publication Data

US 2021/0394520 A1  Dec. 23, 2021

(30) Foreign Application Priority Data

Jun. 17, 2020  (JP) ................. 2020-104682

(51) Int. Cl.
*B41J 2/175* (2006.01)
*B41J 2/14* (2006.01)
*C09D 11/30* (2014.01)

(52) U.S. Cl.
CPC ............ *B41J 2/17563* (2013.01); *B41J 2/14* (2013.01); *B41J 2/17503* (2013.01); *C09D 11/30* (2013.01)

(58) Field of Classification Search
CPC . B41J 2/175; B41J 2/17563; B41J 2/19; B41J 2/18; B41J 2202/19; C09D 11/30; B01D 46/00; B01D 39/00; B01D 67/00; B01D 63/08; B32B 37/00
See application file for complete search history.

(56) References Cited

U.S. PATENT DOCUMENTS

| | | | |
|---|---|---|---|
| 6,190,009 B1 * | 2/2001 | Kitahara | B41J 2/17523 347/93 |
| 9,421,766 B2 * | 8/2016 | Owaku | B41J 2/14233 |
| 10,752,009 B2 * | 8/2020 | Kudo | B41J 2/17553 |
| 2001/0050095 A1 * | 12/2001 | Yamada | B01D 63/0821 134/28 |
| 2006/0028519 A1 * | 2/2006 | Nakamura | B41J 2/17523 347/87 |
| 2006/0044355 A1 | 3/2006 | Ito | |

(Continued)

FOREIGN PATENT DOCUMENTS

| | | |
|---|---|---|
| EP | 3686013 | 7/2020 |
| JP | H05-238003 A | 9/1993 |

(Continued)

*Primary Examiner* — John Zimmermann
(74) *Attorney, Agent, or Firm* — WORKMAN NYDEGGER

(57) ABSTRACT

A flow passage member includes: a supply flow passage through which liquid flows; a filter provided on a path of the supply flow passage, the liquid being configured to pass through the filter; a fixing member which constitutes a part of the supply flow passage and to which the filter is fixed; and a first member which constitutes a part of the supply flow passage and to which the fixing member is fixed; wherein the fixing member is made of thermoplastic resin, and the first member is made of any of thermosetting resin, metal, and ceramic.

19 Claims, 16 Drawing Sheets

(56) References Cited

U.S. PATENT DOCUMENTS

| | | | |
|---|---|---|---|
| 2008/0086077 A1* | 4/2008 | Seto | B05B 17/0653 604/48 |
| 2011/0279606 A1* | 11/2011 | Oguchi | B41J 2/175 347/93 |
| 2015/0251418 A1 | 9/2015 | Owaku et al. | |
| 2016/0031214 A1 | 2/2016 | Okui et al. | |
| 2016/0059546 A1* | 3/2016 | Kondo | B41J 2/04586 347/10 |
| 2016/0059576 A1 | 3/2016 | Ito et al. | |
| 2016/0114592 A1* | 4/2016 | Ishii | B41J 2/17596 347/44 |
| 2017/0282553 A1 | 10/2017 | Hayashi et al. | |
| 2017/0282562 A1 | 10/2017 | Mizuno et al. | |
| 2017/0368820 A1 | 12/2017 | Kobayashi et al. | |
| 2018/0009218 A1 | 1/2018 | Tamura et al. | |
| 2018/0297369 A1* | 10/2018 | Emi | B41J 2/17509 |
| 2019/0100002 A1 | 4/2019 | Ozawa et al. | |
| 2019/0143709 A1 | 5/2019 | Tokimatsu | |
| 2020/0031134 A1* | 1/2020 | Mizuno | B41J 2/18 |
| 2020/0079086 A1 | 3/2020 | Asai et al. | |

FOREIGN PATENT DOCUMENTS

| | | |
|---|---|---|
| JP | H07-081049 A | 3/1995 |
| JP | 2000-177114 | 6/2000 |
| JP | 2006-062097 A | 3/2006 |
| JP | 2007-038489 A | 2/2007 |
| JP | 2009-113250 A | 5/2009 |
| JP | 2014019097 | 2/2014 |
| JP | 2014-193556 A | 10/2014 |
| JP | 2015-030181 | 2/2015 |
| JP | 2015168064 | 9/2015 |
| JP | 2016-034740 | 3/2016 |
| JP | 2016-049725 A | 4/2016 |
| JP | 2017-140723 A | 8/2017 |
| JP | 2017149008 | 8/2017 |
| JP | 2019-064051 | 4/2019 |
| JP | 2020-040291 | 3/2020 |
| JP | 2020-157775 | 10/2020 |
| KR | 2006-0093778 | 8/2006 |
| WO | 2016/117707 A | 7/2016 |
| WO | 2017/208776 A | 12/2017 |

\* cited by examiner

FLOW PASSAGE MEMBER, LIQUID EJECTING HEAD, LIQUID EJECTING APPARATUS, AND METHOD FOR MANUFACTURING FLOW PASSAGE MEMBER

The present application is based on, and claims priority from JP Application Serial Number 2020-104682, filed Jun. 17, 2020, the disclosure of which is hereby incorporated by reference herein in its entirety.

BACKGROUND

1. Technical Field

Embodiments of the present disclosure relate to a flow passage member, a liquid ejecting head, a liquid ejecting apparatus, and a method for manufacturing a flow passage member.

2. Related Art

A liquid ejecting apparatus that includes a liquid ejecting head configured to eject liquid is known in related art. A typical example is an ink-jet printer that ejects ink. For example, as such a liquid ejecting head, a recording head disclosed in JP-A-2016-049725 includes a head body configured to eject droplets of ink from nozzles and includes a flow passage unit configured to supply ink to the head body. The flow passage unit includes an upstream flow passage member inside which an upstream flow passage including a filter chamber is provided. A filter is disposed inside the filter chamber. The upstream flow passage member is made of thermoplastic resin. The filter is fixed to the upstream flow passage member by welding.

JP-A-2014-193556 discloses a flow passage member in which a member forming a flow passage and a filter member are fixed to each other with an adhesive.

In the flow passage member disclosed in JP-A-2014-193556, the filter member is directly fixed, with the adhesive, to the member forming the flow passage. Therefore, there is a risk that the mesh of the filter member might become clogged with the adhesive flowing into the mesh due to capillary action. This is a first issue.

On the other hand, the first issue described above does not occur in the recording head disclosed in JP-A-2016-049725 because the filter is fixed to the upstream flow passage member by welding, without using an adhesive. With the aim of further enhancing the reliability of a structure body in which flow passages are formed, it is conceivable to use thermosetting resin or the like, the rigidity of which is, in general, higher than the rigidity of thermoplastic resin, as the material of the structure body. However, in the recording head disclosed in JP-A-2016-049725, it is necessary that the upstream flow passage member be made of thermoplastic resin for the purpose of the welding. Therefore, it is impossible to use thermosetting resin or the like as the material of the upstream flow passage member. For this reason, in the recording head disclosed in JP-A-2016-049725, it is practically difficult to further enhance the reliability. This is a second issue. A solution to both of the first issue and the second issue described above is awaited.

SUMMARY

A flow passage member according to a certain aspect of the present disclosure includes: a supply flow passage through which liquid flows; a filter provided on a path of the supply flow passage, the liquid being configured to pass through the filter; a fixing member which constitutes a part of the supply flow passage and to which the filter is fixed; and a first member which constitutes a part of the supply flow passage and to which the fixing member is fixed; wherein the fixing member is made of thermoplastic resin, and the first member is made of any of thermosetting resin, metal, and ceramic.

A flow passage member according to another aspect of the present disclosure includes: a supply flow passage through which liquid flows; a filter provided on a path of the supply flow passage, the liquid being configured to pass through the filter; a fixing member constituting a part of the supply flow passage and made of thermosetting resin; and a first member constituting a part of the supply flow passage and made of any of thermosetting resin, metal, and ceramic; wherein the fixing member and the filter are molded integrally by insert molding, and the first member and the fixing member are fixed to each other with an adhesive.

A liquid ejecting head according to a certain aspect of the present disclosure includes: the flow passage member according to either one of the above aspects; and a nozzle from which the liquid passing through the supply flow passage is ejected.

A liquid ejecting apparatus according to a certain aspect of the present disclosure includes: the liquid ejecting head according to the above aspect; and a liquid container that contains the liquid that is to be supplied to the liquid ejecting head.

In a method for manufacturing a flow passage member according to a certain aspect of the present disclosure, the flow passage member includes a supply flow passage through which liquid flows, a filter provided on a path of the supply flow passage such that the liquid is configured to pass through the filter, a fixing member constituting a part of the supply flow passage and made of thermoplastic resin, and a first member constituting a part of the supply flow passage and made of any of thermosetting resin, metal, and ceramic, and the method includes: bonding the fixing member and the first member to each other with an adhesive after welding the filter and the fixing member together.

In a method for manufacturing a flow passage member according to another aspect of the present disclosure, the flow passage member includes a supply flow passage through which liquid flows, a filter provided on a path of the supply flow passage such that the liquid is configured to pass through the filter, a fixing member constituting a part of the supply flow passage and made of thermoplastic resin, and a first member constituting a part of the supply flow passage and made of any of thermosetting resin, metal, and ceramic, and the method includes: bonding the fixing member and the first member to each other with an adhesive after forming the fixing member by insert molding with insertion of the filter.

DESCRIPTION OF EXEMPLARY EMBODIMENTS

Figure 1:
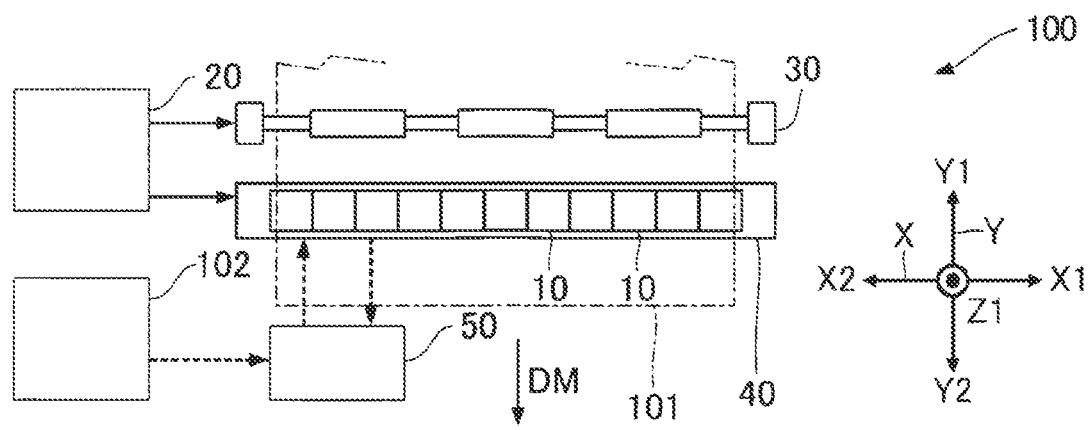
FIG. 1 is a schematic diagram that illustrates an example of the configuration of a liquid ejecting apparatus according to a first embodiment.

With reference to the accompanying drawings, some preferred embodiments of the present disclosure will now be described. The dimensions or scales of parts illustrated in the drawings may be different from actual dimensions or scales, and some parts may be schematically illustrated for easier understanding. The scope of the present disclosure shall not be construed to be limited to these specific examples unless and except where the description below contains an explicit mention of limiting the present disclosure.

The description below is given with reference to X, Y, and Z axes intersecting with one another. One direction along the X axis will be referred to as the X1 direction. The direction that is the opposite of the X1 direction will be referred to as the X2 direction. Similarly, directions that are the opposite of each other along the Y axis will be referred to as the Y1 direction and the Y2 direction. Directions that are the opposite of each other along the Z axis will be referred to as the Z1 direction and the Z2 direction.

Typically, the Z axis is a vertical axis, and the Z2 direction corresponds to a vertically downward direction. However, the Z axis does not necessarily have to be a vertical axis. The Z axis may be inclined with respect to the vertical axis. The X, Y, and Z axes are typically orthogonal to one another, but are not limited thereto. It is sufficient as long as the X, Y, and Z axes intersect with one another within an angular range of, for example, 80° or greater and 100° or less.

1. FIRST EMBODIMENT

1-1. Liquid Ejecting Apparatus 100

FIG. 1 is a schematic diagram that illustrates an example of the configuration of a liquid ejecting apparatus 100 according to a first embodiment. The liquid ejecting apparatus 100 is an ink-jet-type printing apparatus that ejects droplets of ink, which is an example of "liquid", onto a medium 101. The liquid ejecting apparatus 100 according to the present embodiment is a so-called line-type printing apparatus in which plural nozzles configured to eject ink are provided throughout the entire width of the medium 101. A typical example of the medium 101 is printing paper. The medium 101 is not limited to printing paper. The medium 12 may be a print target made of any material such as, for example, a resin film or a cloth.

As illustrated in FIG. 1, a liquid container 102 that contains ink is attached to the liquid ejecting apparatus 100. Some specific examples of the liquid container 102 are: a cartridge that can be detachably attached to the liquid ejecting apparatus 100, a bag-type ink pack made of a flexible film material, an ink tank which can be refilled with ink, etc. Any type of ink may be contained in the liquid container 102.

The liquid container 102 according to the present embodiment includes a first liquid container and a second liquid container, though not illustrated. The liquid container 102 contains ink that is to be supplied to a liquid ejecting head 10, which will be described later. The first liquid container contains first ink. The second liquid container contains second ink, the type of which is different from the type of the first ink. For example, the color of the first ink and the color of the second ink are different from each other. The first ink and the second ink may be the same type of ink. The composition of ink is not specifically limited. For example, the composition of any of water-based ink in which a colorant such as dye or pigment is dissolved in a water-based dissolvent, ultraviolet ray curing ink, solvent-based ink may be employed.

The solvent-based ink is ink in which the main component of the solvent is an organic solvent, and is also referred to as solvent ink or non-water-based ink. The solvent-based ink is ink containing any one or more of glycol ethers, glycol ether esters, dibasic acid esters, ester-based solvents, hydrocarbon-based solvents, and alcohol-based solvents.

Examples of the glycol ether-based solvent include alkylene glycol monoether, alkylene glycol diether, and the like.

Examples of the alkylene glycol monoether include ethylene glycol monomethyl ether, ethylene glycol monoethyl ether, ethylene glycol monoisopropyl ether, ethylene glycol monobutyl ether, ethylene glycol monohexyl ether, ethylene glycol monophenyl ether, diethylene glycol monomethyl ether, diethylene glycol monoethyl ether, diethylene glycol monobutyl ether, diethylene glycol monohexyl ether, diethylene glycol monobenzyl ether, triethylene glycol monomethyl ether, triethylene glycol monoethyl ether, triethylene glycol monobutyl ether, tetraethylene glycol monomethyl ether, tetraethylene glycol monoethyl ether, tetraethylene glycol monobutyl ether, pentaethylene glycol monomethyl ether, pentaethylene glycol monoethyl ether, pentaethylene glycol monobutyl ether, propylene glycol monomethyl ether, propylene glycol monoethyl ether, dipropylene glycol monomethyl ether, dipropylene glycol monoethyl ether, and the like.

Examples of the alkylene glycol diether include ethylene glycol dimethyl ether, ethylene glycol diethyl ether, ethylene glycol dibutyl ether, diethylene glycol dimethyl ether, diethylene glycol diethyl ether, diethylene glycol ethyl methyl ether, diethylene glycol dibutyl ether, diethylene glycol butyl methyl ether, triethylene glycol dimethyl ether, triethylene glycol diethyl ether, triethylene glycol dibutyl ether, triethylene glycol butyl methyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, dipropylene glycol diethyl ether, and the like.

Examples of glycol ether esters include ethylene glycol monomethyl ether acetate, ethylene glycol monoethyl ether acetate, ethylene glycol monopropyl ether acetate, ethylene glycol monobutyl ether acetate, propylene glycol monomethyl ether acetate, propylene glycol monoethyl ether acetate, propylene glycol monopropyl ether acetate, propylene glycol monobutyl ether acetate, dimethylene glycol monomethyl ether acetate, dimethylene glycol monoethyl ether acetate, dimethylene glycol monopropyl ether acetate, dimethylene glycol monobutyl ether acetate, diethylene glycol monomethyl ether acetate, diethylene glycol monoethyl ether acetate, diethylene glycol monopropyl ether acetate, diethylene glycol monobutyl ether acetate, dipropylene glycol monomethyl ether acetate, dipropylene glycol monoethyl ether acetate, dipropylene glycol monopropyl ether acetate, dipropylene glycol monobutyl ether acetate, trimethylene glycol monomethyl ether acetate, trimethylene glycol monoethyl ether acetate, trimethylene glycol monopropyl ether acetate, trimethylene glycol monobutyl ether acetate, triethylene glycol monomethyl ether acetate, triethylene glycol monoethyl ether acetate, triethylene glycol monopropyl ether acetate, triethylene glycol monobutyl ether acetate, tripropylene glycol monomethyl ether acetate, tripropylene glycol monoethyl ether acetate, tripropylene glycol monopropyl ether acetate, tripropylene glycol monobutyl ether acetate, 3-methoxybutyl acetate, 3-methoxy-3-methyl-1-butyl acetate, and the like.

Examples of dibasic acid esters include monoesters and diesters of dicarboxylic acids (for example, aliphatic dicarboxylic acids such as glutaric acid, adipic acid, and succinic acid). Specifically, dimethyl-2-methylglutarate and the like can be mentioned.

Examples of the ester-based solvent include methyl acetate, ethyl acetate, n-propyl acetate, isopropyl acetate, n-butyl acetate, isobutyl acetate, isopentyl acetate, sec-butyl acetate, amyl acetate, methoxybutyl acetate, methyl lactate, ethyl lactate, butyl lactate, methyl caprylate, methyl laurate, isopropyl laurate, isopropyl myristate, isopropyl palmitate, isooctyl palmitate, isostearyl palmitate, methyl oleate, ethyl oleate, isopropyl oleate, butyl oleate, methyl linoleate, isobutyl linoleate, ethyl linoleate, isopropyl isostearate, soybean oil methyl, soybean oil isobutyl, tall oil methyl, tall oil isobutyl, diisopropyl adipate, diisopropyl sebacate, diethyl sebacate, propylene glycol monocaprate, tris(2-ethylhexanoic acid) trimethylolpropane, tris(2-ethylhexanoic acid) glyceryl, ethylene glycol monomethyl ether acetate, ethylene glycol monoethyl ether acetate, propylene glycol monomethyl ether acetate, propylene glycol monoethyl ether acetate, diethylene glycol monomethyl ether acetate, diethylene glycol monoethyl ether acetate, diethylene glycol monobutyl ether acetate, and the like.

Examples of hydrocarbon-based solvents include aliphatic hydrocarbons (for example, paraffin and isoparaffin), alicyclic hydrocarbons (for example, cyclohexane, cyclooctane, and cyclodecane), aromatic hydrocarbons (for example, benzene, toluene, xylene, naphthalene, and tetralin), and the like. As such a hydrocarbon-based solvent, a commercially available product may be used, and examples thereof include aliphatic hydrocarbons or alicyclic hydrocarbons such as IP Solvent 1016, IP Solvent 1620, IP Clean LX (all above are trade names manufactured by Idemitsu Kosan Co., Ltd.), Isopar G, Isopar L, Isopar H, Isopar M, Exxsol D40, Exxsol D80, Exxsol D100, Exxsol D130, Exxsol D140 (all above are trade names manufactured by Exxon Corporation), NS Clean 100, NS Clean 110, NS Clean 200, NS Clean 220 (all above are trade names of JXTG Energy Co., Ltd.), Naphthesol 160, Naphthesol 200, Naphthesol 220 (all above are trade names of JXTG Energy Co., Ltd.), and aromatic hydrocarbons such as Solvesso 200 (trade name manufactured by Exxon Corporation).

Examples of alcohol-based solvents include methanol, ethanol, isopropanol, 1-propanol, 1-butanol, 2-butanol, 3-pentanol, 2-methyl-1-butanol, 2-methyl-2-butanol, isoamyl alcohol, 3-methyl-2-butanol, 3-methoxy-3-methyl-1-butanol, 4-methyl-2-pentanol, allyl alcohol, 1-hexanol, 1-heptanol, 2-heptanol, 3-heptanol, isomyristyl alcohol, isopalmityl alcohol, isostearyl alcohol, oleyl alcohol, and the like.

The aforementioned ultraviolet ray curing ink is UV ink containing, for example, a monomer, an oligomer, or the like that undergoes a polymerization reaction and cures when irradiated with ultraviolet rays. Examples of the ultraviolet ray curing ink include ink whose composition includes any of (meth)acrylates, (meth)acrylamides, and N-vinyl compounds as a polymerizable compound.

Examples of monofunctional (meth)acrylates include hexyl (meth)acrylate, 2-ethylhexyl (meth)acrylate, tert-octyl (meth)acrylate, isoamyl (meth)acrylate, decyl (meth)acrylate, isodecyl (meth)acrylate, stearyl (meth)acrylate, isostearyl (meth)acrylate, cyclohexyl (meth)acrylate, 4-n-butylcyclohexyl (meth)acrylate, bornyl (meth)acrylate, isobornyl (meth)acrylate, benzyl (meth)acrylate, 2-ethylhexyl diglycol (meth)acrylate, butoxyethyl (meth)acrylate, 2-chloroethyl (meth)acrylate, 4-bromobutyl (meth)acrylate, cyanoethyl (meth)acrylate, benzyl (meth)acrylate, butoxymethyl (meth)acrylate, 3-methoxybutyl (meth)acrylate, alkoxymethyl (meth)acrylate, alkoxyethyl (meth)acrylate, 2-(2-methoxyethoxy)ethyl (meth)acrylate, 2-(2-butoxyethoxy)ethyl (meth)acrylate, 2,2,2-tetrafluoroethyl (meth)acrylate, 1H,1H,2H,2H-perfluorodecyl (meth)acrylate, 4-butylphenyl (meth)acrylate, phenyl (meth)acrylate, 2,4 5-tetramethylphenyl (meth)acrylate, 4-chlorophenyl (meth)acrylate, phenoxymethyl (meth)acrylate, phenoxyethyl (meth)acrylate, glycidyl (meth)acrylate, glycidyloxybutyl (meth)acrylate, glycidyloxyethyl (meth)acrylate, glycidyloxypropyl (meth)acrylate, tetrahydrofurfuryl (meth)acrylate, hydroxyalkyl (meth)acrylate, 2-hydroxyethyl (meth)acrylate, 3-hydroxypropyl (meth)acrylate, 2-hydroxypropyl (meth)acrylate, 2-hydroxybutyl (meth)acrylate, 4-hydroxybutyl (meth)acrylate, dimethylaminoethyl (meth)acrylate, diethylaminoethyl (meth)acrylate, dimethylaminopropyl (meth)acrylate, diethylaminopropyl (meth)acrylate, trimethoxysilylpropyl (meth) acrylate, dicyclopentenyl (meth)acrylate, dicyclopentenyloxyethyl (meth)acrylate, trimethoxysilylpropyl (meth)acrylate, trimethylsilylpropyl (meth)acrylate, polyethylene oxide monomethyl ether (meth)acrylate, oligoethylene oxide monomethyl ether (meth)acrylate, polyethylene oxide (meth)acrylate, oligoethylene oxide (meth)acrylate, oligoethylene oxide monoalkyl ether (meth)acrylate, polyethylene oxide monoalkyl ether (meth)acrylate, dipropylene glycol (meth)acrylate, polypropylene oxide monoalkyl ether (meth)acrylate, oligopropylene oxide monoalkyl ether (meth)acrylate, 2-methacryloyloxyethyl succinic acid, 2-methacryloyloxyhexahydrophthalic acid, 2-methacryloyloxyethyl-2-hydroxypropyl phthalate, butoxydiethylene glycol (meth)acrylate, trifluoroethyl (meth)acrylate, perfluorooctylethyl (meth)acrylate, 2-hydroxy-3-phenoxypropyl (meth)acrylate, EO-modified phenol (meth)acrylate, EO-modified cresol (meth)acrylate, EO-modified nonylphenol (meth)acrylate, PO-modified nonylphenol (meth)acrylate, and EO-modified 2-ethylhexyl (meth)acrylate.

Examples of polyfunctional (meth)acrylates include bifunctional (meth)acrylates such as 1,6-hexanediol di(meth)acrylate and 1,10-decanediol di(meth)acrylate, neopentyl glycol di(meth)acrylate, dipropylene glycol di(meth)acrylate (DPGD(M)A), tripropylene glycol di(meth)acrylate (TPGD(M)A), 2,4-dimethyl-1,5-pentanediol di(meth)acrylate, butylethylpropanediol di(meth)acrylate, ethoxylated cyclohexanemethanol di(meth)acrylate, triethylene glycol di(meth)acrylate (TEGD(M)A), polyethylene glycol di(meth)acrylate, oligoethylene glycol di(meth)acrylate, ethylene glycol di(meth)acrylate, 2-ethyl-2-butyl-butanediol di(meth)acrylate, hydroxypivalic acid neopentyl glycol di(meth)acrylate, dimethylol tricyclodecane di(meth)acrylate, EO-modified bisphenol A di(meth)acrylate, bisphenol F polyethoxy di(meth)acrylate, polypropylene glycol di(meth)acrylate, oligopropylene glycol di(meth)acrylate, 1,4-butanediol di(meth)acrylate, 2-ethyl-2-butyl-propanediol di(meth)acrylate, 1,9-nonanediol di(meth)acrylate, propoxy ethoxylated bisphenol A di(meth)acrylate, and tricyclodecane di(meth)acrylate.

Examples of polyfunctional (meth)acrylates further include trimethylolpropane tri(meth)acrylate, trimethylolethane tri(meth)acrylate, alkylene oxide-modified tri(meth)acrylate of trimethylolpropane, pentaerythritol tri(meth)acrylate, dipentaerythritol tri(meth)acrylate, trimethylolpropane tri((meth)acryloyloxypropyl) ether, isocyanuric acid alkylene oxide modified tri(meth)acrylate, dipentaerythritol propionate tri(meth)acrylate, tri((meth)acryloyloxyethyl)isocyanurate, hydroxypivalaldehyde-modified dimethylolpropane tri(meth)acrylate, sorbitol tri(meth)acrylate, propoxylated trimethylolpropane tri(meth)acrylate, ethoxylated glycerin tri(meth)acrylate: above trifunctional, pentaerythritol tetra(meth)acrylate, sorbitol tetra(meth)acrylate, ditrimethylolpropane tetra(meth)acrylate, dipentaerythritol tetra(meth)acrylate propionate, ethoxylated pentaerythritol tetra(meth)acrylate: above tetrafunctional, sorbitol penta(meth)acrylate, dipentaerythritol penta(meth)acrylate: above pentafunctional, dipentaerythritol hexa(meth)acrylate, sorbitol hexa(meth)acrylate, phosphazene alkylene oxide-modified hexa(meth)acrylate, caprolactone-modified dipentaerythritol hexa(meth)acrylate: above hexafunctional, and the like.

Examples of (meth)acrylamides include (meth)acrylamide, N-methyl(meth)acrylamide, N-ethyl(meth)acrylamide, N-propyl(meth)acrylamide, N-n-butyl(meth)acrylamide, N-t-butyl(meth)acrylamide, N-butoxymethyl(meth)acrylamide, N-isopropyl(meth)acrylamide, N-methylol(meth)acrylamide, N,N-dimethyl(meth)acrylamide, N,N-diethyl (meth)acrylamide, and (meth)acryloylmorpholine.

The N-vinyl compound has a structure in which a vinyl group is bonded to nitrogen ($>$N—CH=CH$_2$). Specific examples of the N-vinyl compound include N-vinylformamide, N-vinylcarbazole, N-vinylindole, N-vinylpyrrole, N-vinylacetamide, N-vinylpyrrolidone, N-vinylcaprolactam, and their derivatives. Among them, N-vinylcaprolactam is particularly preferable.

The liquid ejecting apparatus 100 includes a control unit 20, a transport mechanism 30, a liquid ejecting module 40, and a circulation mechanism 50. The control unit 20 controls the operation of each component of the liquid ejecting apparatus 100. The control unit 20 includes a processing circuit, for example, a CPU (central processing unit) or an FPGA (field programmable gate array), and a storage circuit such as a semiconductor memory. Various kinds of program and data are stored in the storage circuit. The processing circuit realizes various kinds of control by running the program and using the data.

The transport mechanism 30 transports the medium 101 in a direction DM in accordance with control by the control unit 20. The direction DM according to the present embodiment is the Y2 direction. In the example illustrated in FIG. 1, the transport mechanism 30 includes a transport roller that is elongated along the X axis and a motor that rotates the transport roller. The configuration of the transport mechanism 30 is not limited to the illustrated example in which the transport roller is used. For example, a drum that transports the medium 101 in a state in which the medium 101 is attracted to the circumferential surface of the drum due to an electrostatic force, etc., or an endless belt, may be used instead.

Ink is supplied from the liquid container 102 to the liquid ejecting module 40 via the circulation mechanism 50. In accordance with control by the control unit 20, the liquid ejecting module 40 ejects the supplied ink from each of a plurality of nozzles toward the medium 101 in the Z2 direction. The liquid ejecting module 40 is a line head that includes a plurality of liquid ejecting heads 10 arranged such that the nozzles are distributed throughout the entire width of the medium 101 in the direction of the X axis. That is, these liquid ejecting heads 10 constitute a line head that is elongated in the direction in which the X axis extends. Concurrently with the transportation of the medium 101 by the transport mechanism 30, ink is ejected from the plurality of liquid ejecting heads 10. As a result of this concurrent operation, an image is formed of ink on the surface of the medium 101. The liquid ejecting module 40 may be a non-multi-head-type line head that is elongated in the direction in which the X axis extends. That is, the liquid ejecting module 40 may include only a single liquid ejecting head 10 arranged such that the nozzles are distributed throughout the entire width of the medium 101 in the direction in which the X axis extends.

In the example illustrated in FIG. 1, the liquid container 102 is connected indirectly to the liquid ejecting module 40, with the circulation mechanism 50 provided therebetween. The circulation mechanism 50 is a mechanism that supplies ink to the liquid ejecting module 40 and collects ink discharged from the liquid ejecting module 40 for the purpose of supplying the collected ink to the liquid ejecting module 40 again. The circulation mechanism 50 includes, for example, a sub tank that contains ink, a supply flow passage through which ink is supplied from the sub tank to the liquid ejecting module 40, a collection flow passage through which ink is collected into the sub tank from the liquid ejecting module 40, and a pump for causing ink to flow. These components are provided individually for each of the first ink and the second ink mentioned above. The above operation of the circulation mechanism 50 makes it possible to suppress an increase in the viscosity of ink and reduce the stay of air bubbles in ink.

The liquid ejecting apparatus 100 may include a maintenance mechanism that is used for maintenance operation of the liquid ejecting module 40. The maintenance operation includes, for example, flushing operation and cleaning operation. The flushing operation is operation of forcibly ejecting ink that does not directly contribute to the forming of an image from a plurality of nozzles. The cleaning operation is operation of forcibly discharging ink that is present inside the liquid ejecting module 40 from a plurality of nozzles either by applying pressure from the upstream relative to the liquid ejecting module 40 or by applying a suction force from the downstream relative to the liquid ejecting module 40. The maintenance mechanism includes a flushing box that receives ink ejected from each nozzle N when the flushing operation is performed and a cap for hermetically sealing the plurality of nozzles N when the cleaning operation is performed.

As described above, the liquid ejecting apparatus 100 includes the liquid ejecting head 10, the liquid container 102 that contains ink to be supplied to the liquid ejecting head 10, and the transport mechanism 30 that transports the medium 101 that receives ink ejected from the liquid ejecting head 10.

1-2. Liquid Ejecting Module 40

Figure 2:
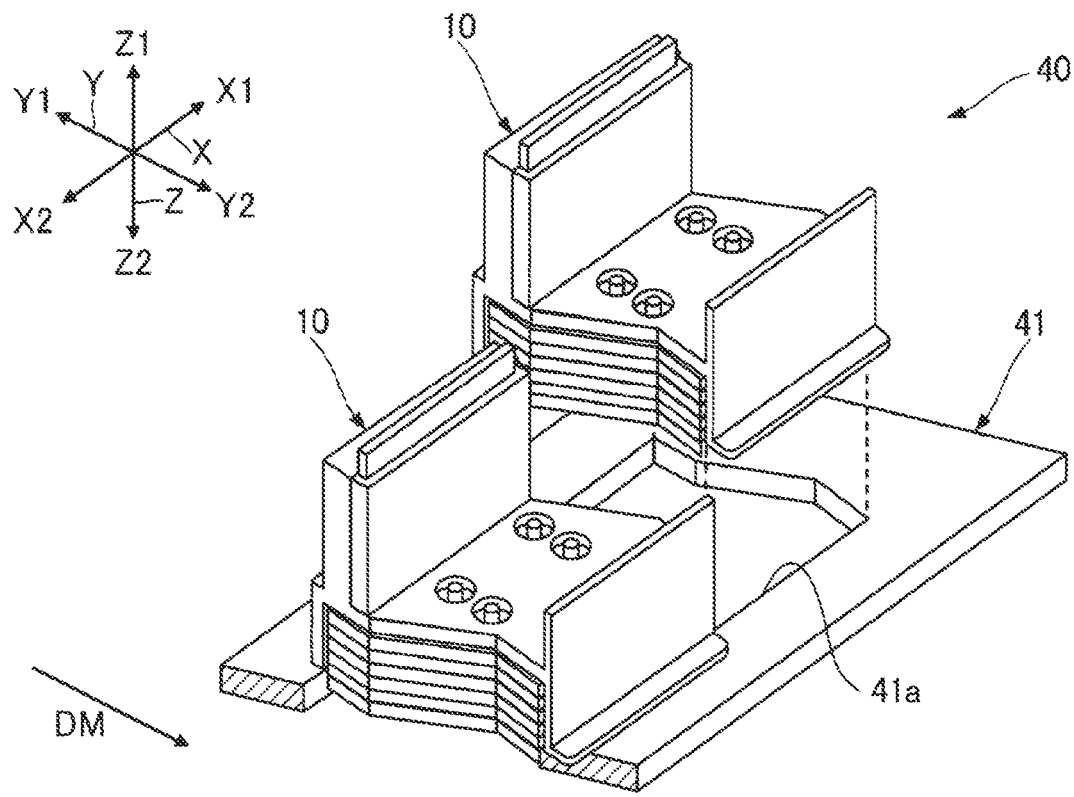
FIG. 2 is a perspective view of a liquid ejecting module that includes liquid ejecting heads according to the first embodiment.

FIG. 2 is a perspective view of the liquid ejecting module 40 that includes the liquid ejecting heads 10 according to the first embodiment. As illustrated in FIG. 2, the liquid ejecting module 40 includes a support 41 and the plurality of liquid ejecting heads 10. The support 41 is a member that supports the plurality of liquid ejecting heads 10. In the example illustrated in FIG. 2, the support 41 is a plate-like member made of metal, etc. The support 41 has a mount hole 41a for mounting the plurality of liquid ejecting heads 10. The plurality of liquid ejecting heads 10 is mounted in the mount hole 41a in a state of being arranged in a row in the direction along the X axis. Each of the plurality of liquid ejecting heads 10 is fastened to the support 41 by screws, etc. In FIG. 2, two liquid ejecting heads 10 are illustrated as a representative example. The liquid ejecting module 40 may include any number of the liquid ejecting heads 10. The shape, etc. of the support 41 is also not limited to the example illustrated in FIG. 2. The support 41 may have any shape, etc.

1-3. Liquid Ejecting Head 10

Figure 3:
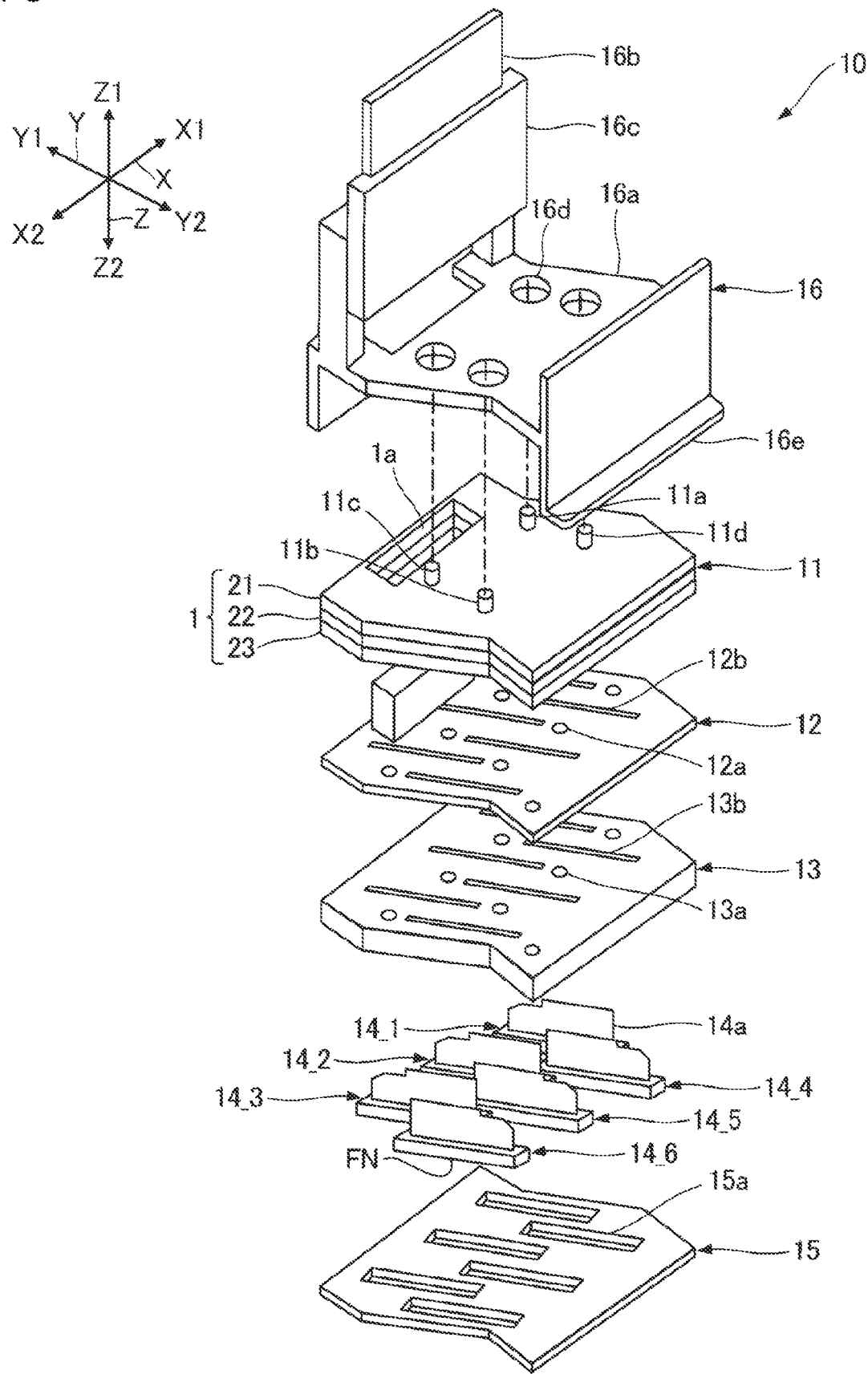
FIG. 3 is an exploded perspective view of the liquid ejecting head illustrated in FIG. 2.

FIG. 3 is an exploded perspective view of the liquid ejecting head 10 illustrated in FIG. 2. As illustrated in FIG. 3, the liquid ejecting head 10 includes a flow passage structure body 11, a wiring board 12, a holder 13, a plurality of head bodies 14_1, 14_2, 14_3, 14_4, 14_5, and 14_6, a fixing plate 15, and a base 16. These components are disposed in the following order as viewed toward Z2: the base 16, the flow passage structure body 11, the wiring board 12, the holder 13, the plurality of head bodies 14_1, 14_2, 14_3, 14_4, 14_5, and 14_6, and, finally, the fixing plate 15. The components of the liquid ejecting head 10 will be described below sequentially. In the description below, each individual one of the plurality of head bodies 14_1, 14_2, 14_3, 14_4, 14_5, and 14_6 is sometimes simply referred to as "head body 14".

The flow passage structure body 11 is a structure body inside which flow passages for flow of ink between the circulation mechanism 50 and the plurality of head bodies 14 are provided. As illustrated in FIG. 3, the flow passage structure body 11 includes a flow passage member 1 and connection pipes 11a, 11b, 11c, and 11d. A supply flow passage for supplying the first ink to the plurality of head bodies 14, a supply flow passage for supplying the second ink to the plurality of head bodies 14, a discharge flow passage for discharging the first ink from the plurality of head bodies 14, and a discharge flow passage for discharging the second ink from the plurality of head bodies 14 are provided inside the flow passage member 1, though not illustrated in FIG. 3. A filter for catching a foreign object, etc. "en route" is provided on a path of each supply flow passage. The internal structure of the flow passage member 1 will be described in detail later.

The flow passage member 1 has layers 21, 22, and 23. They constitute a stack of layers in this order as viewed toward Z2. Flow passages such as supply flow passages and discharge flow passages are formed by providing grooves or holes, etc. in these layers. Each of the layers 21, 22, and 23 is, for example, made of a resin material and is formed by injection molding. The layers 21, 22, and 23 are bonded to each other with an adhesive, for example. The thickness of the layers 21, 22, and 23 along the Z axis may be the same as one another or different from one another.

The flow passage member 1 has a plate-like shape with a plane perpendicular to the Z axis. In the example illustrated in FIG. 3, the flow passage member 1 has a hole 1a, into which a connector 12c described later is inserted. The flow passage member 1 described above has a surface facing in the Z1 direction, and the connection pipes 11a, 11b, 11c, and 11d protrude from this surface.

The connection pipe 11a is a pipe that constitutes a flow passage for supplying the first ink to the flow passage member 1. The connection pipe 11b is a pipe that constitutes a flow passage for supplying the second ink to the flow passage member 1. The connection pipe 11c is a pipe that constitutes a flow passage for discharging the first ink from the flow passage member 1. The connection pipe 11d is a pipe that constitutes a flow passage for discharging the second ink from the flow passage member 1.

The wiring board 12 is a mount component for electric connection between the plurality of head bodies 14 and a congregated board 16b described later. For example, the wiring board 12 is a rigid wiring board. The wiring board 12 is disposed between the flow passage structure body 11 and the holder 13. The wiring board 12 has a surface facing the flow passage structure body 11. On this surface, the connector 12c is provided. The connector 12c is a connection component coupled to the congregated board 16b described later. The wiring board 12 has a plurality of holes 12a and a plurality of openings 12b. Each of the plurality of holes 12a is a hole that allows connection between the flow passage structure body 11 and the holder 13. Each of the plurality of openings 12b is a slit through which a wiring member 14a for connection between the head body 14 and the wiring board 12 is inserted. The wiring board 12 has a surface facing in the Z1 direction, and the wiring member 14a is connected to this surface. The wiring member 14a is a member that includes wiring for electric connection to a drive element Ea or Eb described later. The wiring member 14a is, for example, an FPC (Flexible Printed Circuit) or a COF (Chip On Film), etc.

The holder 13 is a structure component that houses and supports the plurality of head bodies 14. The holder 13 is made of, for example, a resin material or a metal material, etc. The holder 13 has a plate-like shape with a plane perpendicular to the Z axis. The holder 13 has a plurality of ink holes 13a and a plurality of wiring holes 13b. Each of the plurality of ink holes 13a is a flow-passage-structure-bodyside opening in a flow passage through which ink flows between the head body 14 and the flow passage structure body 11. Each of the plurality of wiring holes 13b is a slit through which the wiring member 14a for connection between the head body 14 and the wiring board 12 is inserted. The holder 13 has the following flow passages inside, though not illustrated: a supply flow passage through which the first ink is supplied to the head body 14, a supply flow passage through which the second ink is supplied to the head body 14, a circulation flow passage for allowing the first ink to flow from the head body 14 to a discharge flow passage CM of the flow passage structure body 11, and a circulation flow passage for allowing the second ink to flow from the head body 14 to a discharge flow passage CM of the flow passage structure body 11. In addition, a branch flow passage for distribution or gathering of ink between each ink hole 13a and the plurality of head bodies 14 is provided inside the holder 13, though not illustrated. The holder 13 has a surface facing in the Z2 direction, and, in this surface, a plurality of recesses for accommodating the plurality of head bodies 14 respectively is provided, though not illustrated.

Each of the plurality of head bodies 14 ejects ink. Specifically, though not illustrated in FIG. 3, each of the plurality of head bodies 14 has a plurality of nozzles through which the first ink is ejected and a plurality of nozzles through which the second ink is ejected. These nozzles are provided in a nozzle face FN. The nozzle face FN is the surface, of each of the plurality of head bodies 14, facing in the Z2 direction. The structure of the head body 14 will be described later.

The fixing plate 15 is a plate member for fixing the plurality of head bodies 14 to the holder 13. Specifically, the fixing plate 15 is positioned such that the plurality of head bodies 14 is interposed between the holder 13 and the fixing plate 15. Then, the fixing plate 15 is fixed to the holder 13 with an adhesive. The fixing plate 15 is made of, for example, a metal material, etc. The fixing plate 15 has a plurality of openings 15a for exposure of the nozzles of the plurality of head bodies 14. In the example illustrated in FIG. 3, each of the plurality of openings 15a is provided individually for the corresponding one of the plurality of head bodies 14. The opening 15a may be shared by two or more head bodies 14.

The base 16 is a member for fixing the flow passage structure body 11, the wiring board 12, the holder 13, the plurality of head bodies 14, and the fixing plate 15 to the support 41 described earlier. The base 16 includes a base body 16a, the congregated board 16b, and a cover 16c.

By being fastened to the holder 13 by screws, etc., the base body 16a holds the flow passage structure body 11 and the wiring board 12, which are disposed between the base 16 and the holder 13. The base body 16a is made of, for example, a resin material, etc. The base body 16a has a plate-like portion facing the flow passage member 1 described above. This plate-like portion has a plurality of holes 16d into which the connection pipes 11a, 11b, 11c, and 11d described above are inserted. The base body 16a has a portion extending in the Z2 direction from this plate-like portion. A flange 16e for being fixed to the support 41 described earlier is provided at the end of the portion extending in the Z2 direction.

The congregated board 16b is a mount component for electric connection between the control unit 20 and the wiring board 12 described earlier. The congregated board 16b is, for example, a rigid wiring board. The cover 16c is a plate-like member for protecting the congregated board 16b and fixing the congregated board 16b to the base body 16a. The cover 16c is made of, for example, a resin material, etc., and is fastened to the base body 16a by screws, etc.

1-4. Head Body 14

Figure 4:
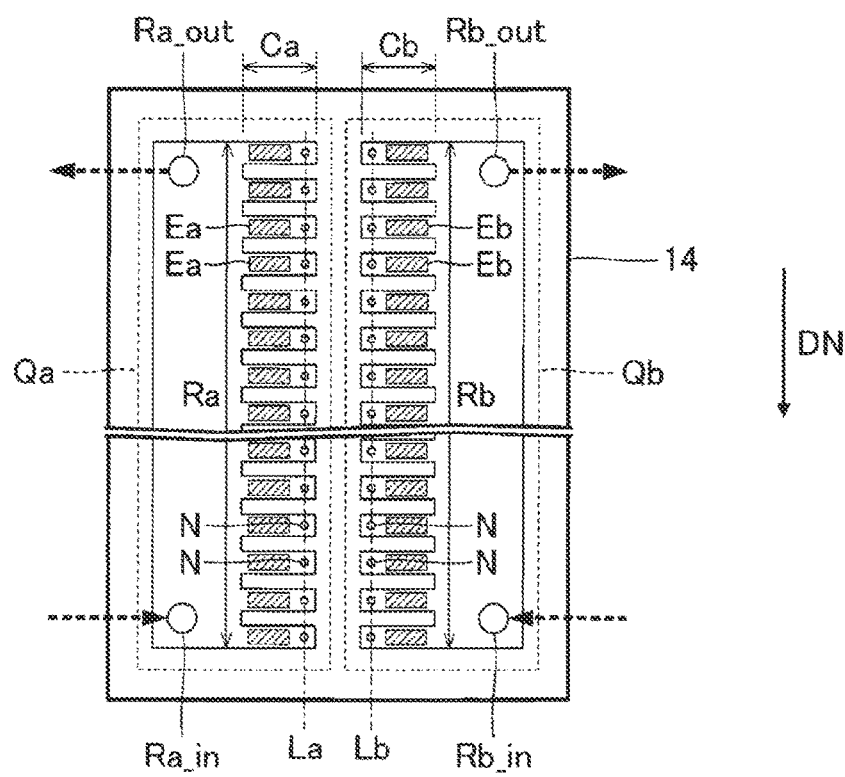
FIG. 4 is a plan view of a head body of the liquid ejecting head.

FIG. 4 is a plan view of the head body 14 of the liquid ejecting head 10. In FIG. 4, the internal structure of the head body 14 as viewed in the Z1 direction is schematically illustrated. As illustrated in FIG. 4, the head body 14 includes a liquid ejecting section Qa and a liquid ejecting section Qb. The liquid ejecting section Qa includes a nozzle row La that is made up of a plurality of nozzles N configured to eject the first ink supplied from the circulation mechanism 50 described earlier. The liquid ejecting section Qb includes a nozzle row Lb that is made up of a plurality of nozzles N configured to eject the second ink supplied from the circulation mechanism 50. The nozzles N belonging to the nozzle row La are arranged in a direction DN. The nozzles N belonging to the nozzle row Lb are also arranged in the direction DN.

The liquid ejecting section Qa includes a liquid reservoir Ra, a plurality of pressure compartments Ca, and a plurality of drive elements Ea. The liquid reservoir Ra is a common liquid chamber that is continuous throughout the plurality of nozzles N belonging to the nozzle row La. Each of the plurality of pressure compartments Ca is provided individually for the corresponding one of the plurality of nozzles N belonging to the nozzle row La. Each of the plurality of drive elements Ea is also provided individually for the corresponding one of the plurality of nozzles N belonging to the nozzle row La. The pressure compartment Ca is a space that is in communication with the nozzle N. To each of the plurality of pressure compartments Ca, the first ink is supplied from the liquid reservoir Ra to fill its space. The drive element Ea changes the pressure of the first ink inside the pressure compartment Ca. The drive element Ea is, for example, a piezoelectric element that changes the capacity of the pressure compartment Ca by deforming a wall surface of the pressure compartment Ca, or a heat generation element that produces air bubbles inside the pressure compartment Ca by heating the first ink inside the pressure compartment Ca. As a result of causing changes in the pressure of the first ink inside the pressure compartment Ca by the drive element Ea, the first ink contained inside the pressure compartment Ca is ejected from the nozzle N.

Similarly to the liquid ejecting section Qa, the liquid ejecting section Qb includes a liquid reservoir Rb, a plurality of pressure compartments Cb, and a plurality of drive elements Eb. The liquid reservoir Rb is a common liquid chamber that is continuous throughout the plurality of nozzles N belonging to the nozzle row Lb. Each of the plurality of pressure compartments Cb is provided individually for the corresponding one of the plurality of nozzles N belonging to the nozzle row Lb. Each of the plurality of drive elements Eb is also provided individually for the corresponding one of the plurality of nozzles N belonging to the nozzle row Lb. To each of the plurality of pressure compartments Cb, the second ink is supplied from the liquid reservoir Rb to fill its space. The drive element Eb is, for example, a piezoelectric element or a heat generation element mentioned above. As a result of causing changes in the pressure of the second ink inside the pressure compartment Cb by the drive element Eb, the second ink contained inside the pressure compartment Cb is ejected from the nozzle N.

As illustrated in FIG. 4, an inlet Ra_in, an outlet Ra_out, an inlet Rb_in, and an outlet Rb_out are provided in the head body 14. Each of the inlet Ra_in and the outlet Ra_out is in communication with the liquid reservoir Ra. Each of the inlet Rb_in and the outlet Rb_out is in communication with the liquid reservoir Rb.

In the head body 14 described above, the first ink that remains in the liquid reservoir Ra without being ejected from the nozzles N belonging to the nozzle row La circulates by flowing through the outlet Ra_out, the circulation flow passage for the first ink in the holder 13, the discharge flow passage for the first ink in the flow passage structure body 11, the sub tank for the first ink in the circulation mechanism 50, the supply flow passage for the first ink in the flow passage structure body 11, the supply flow passage for the first ink in the holder 13, the inlet Ra_in, and the liquid reservoir Ra in this order. Similarly, the second ink that remains in the liquid reservoir Rb without being ejected from the nozzles N belonging to the nozzle row Lb circulates by flowing through the outlet Rb_out, the circulation flow passage for the second ink in the holder 13, the discharge flow passage for the second ink in the flow passage structure body 11, the sub tank for the second ink in the circulation mechanism 50, the supply flow passage for the second ink in the flow passage structure body 11, the supply flow passage for the second ink in the holder 13, the inlet Rb_in, and the liquid reservoir Rb in this order.

Figure 5:
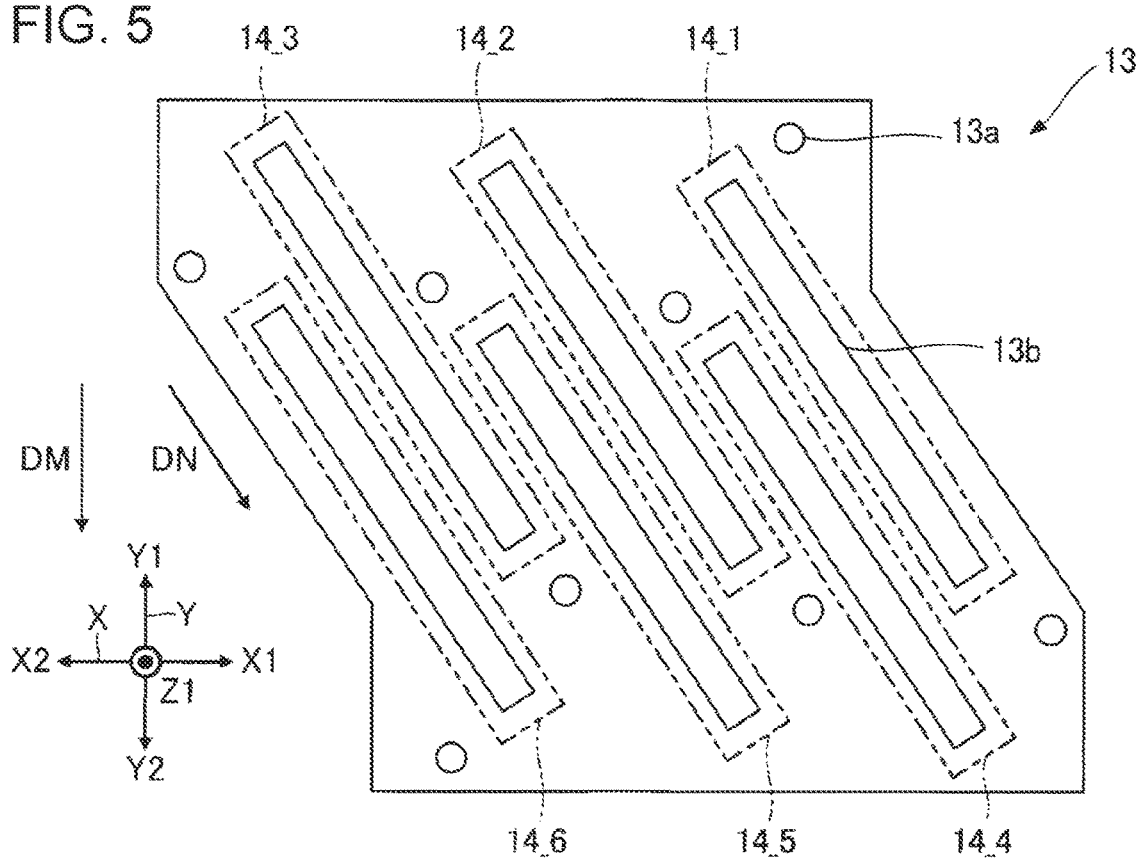
FIG. 5 is a plan view of a holder.

FIG. 5 is a plan view of the holder 13. As illustrated in FIG. 5, the holder 13 holds six head bodies 14_1 to 14_6. These head bodies are arranged in the X2 direction in the order of 14_1, 14_4, 14_2, 14_5, 14_3, 14_6. These head bodies are arranged in a staggered manner such that 14_1 to 14_3 are shifted in the Y1 direction from 14_4 to 14_6. However, the head bodies 14_1 to 14_6 have portions overlapping with one another as viewed in the X1 direction or the X2 direction. In addition, the head bodies 14_1 to 14_6 are arranged such that the linear array direction DN of the nozzle row La and the linear array direction DN of the nozzle row Lb are parallel to each other. However, each of the head bodies 14_1 to 14_6 is arranged such that the direction DN is inclined with respect to the direction DM, which is the transportation direction of the medium 101.

As described above, the liquid ejecting head 10 includes the flow passage member 1 and the nozzles N from which ink supplied from the supply flow passages is ejected.

1-5. Flow Passage Member 1

Figure 6:
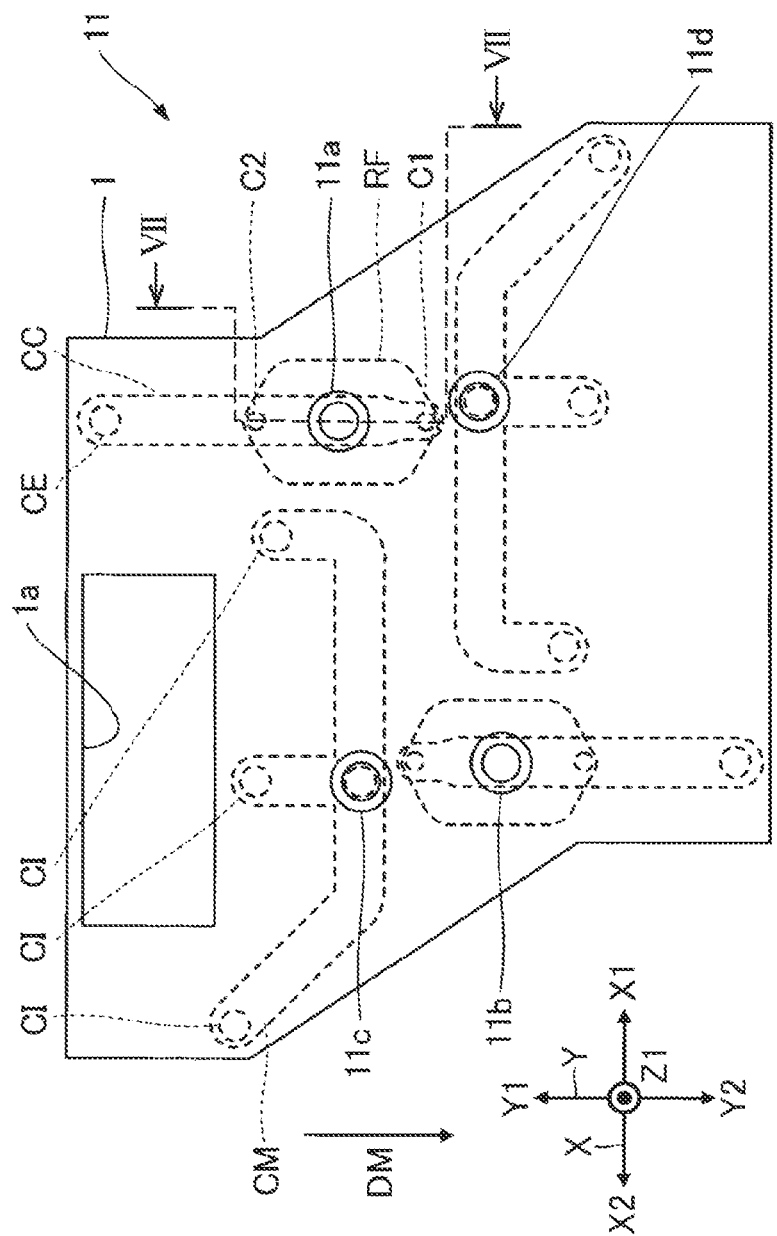
FIG. 6 is a plan view of a flow passage structure body.

FIG. 6 is a plan view of the flow passage structure body 11. In FIG. 6, an example of the internal structure of the flow passage member 1 as viewed in the Z2 direction is illustrated by broken lines. As illustrated in FIG. 6, two supply flow passages CC, two discharge flow passages CM, and two filter chambers RF are provided inside the flow passage member 1.

One of the two supply flow passages CC is a flow passage for supplying ink from the connection pipe 11a to the liquid reservoir Ra of each of the plurality of head bodies 14. The other of the two supply flow passages CC is a flow passage for supplying ink from the connection pipe 11b to the liquid reservoir Rb of each of the plurality of head bodies 14. For each of the two supply flow passages CC, an outlet CE, through which ink goes out toward the head bodies 14, is provided in communication with the supply flow passage CC. The supply flow passage CC is in communication with the internal space of the connection pipe 11a or 11b via the filter chamber RF. The filter chamber RF is a space inside which a filter 25 described later is provided. The filter chamber RF is in communication with the supply flow passage CC via a first flow passage C1 and a second flow passage C2. Either the first flow passage C1 or the second flow passage C2 may be omitted. In this case, it is preferable to dispose the other of the first flow passage C1 and the second flow passage C2 on the central axis of the filter chamber RF.

One of the two discharge flow passages CM is a flow passage for discharging ink from the liquid reservoir Ra of each of the plurality of head bodies 14 to the connection pipe 11c. The other of the two discharge flow passages CM is a flow passage for discharging ink from the liquid reservoir Rb of each of the plurality of head bodies 14 to the connection pipe 11d. For each of the two discharge flow passages CM, an inlet CI, through which ink coming from the head bodies 14 enters, is provided in communication with the discharge flow passage CM.

Figure 7:
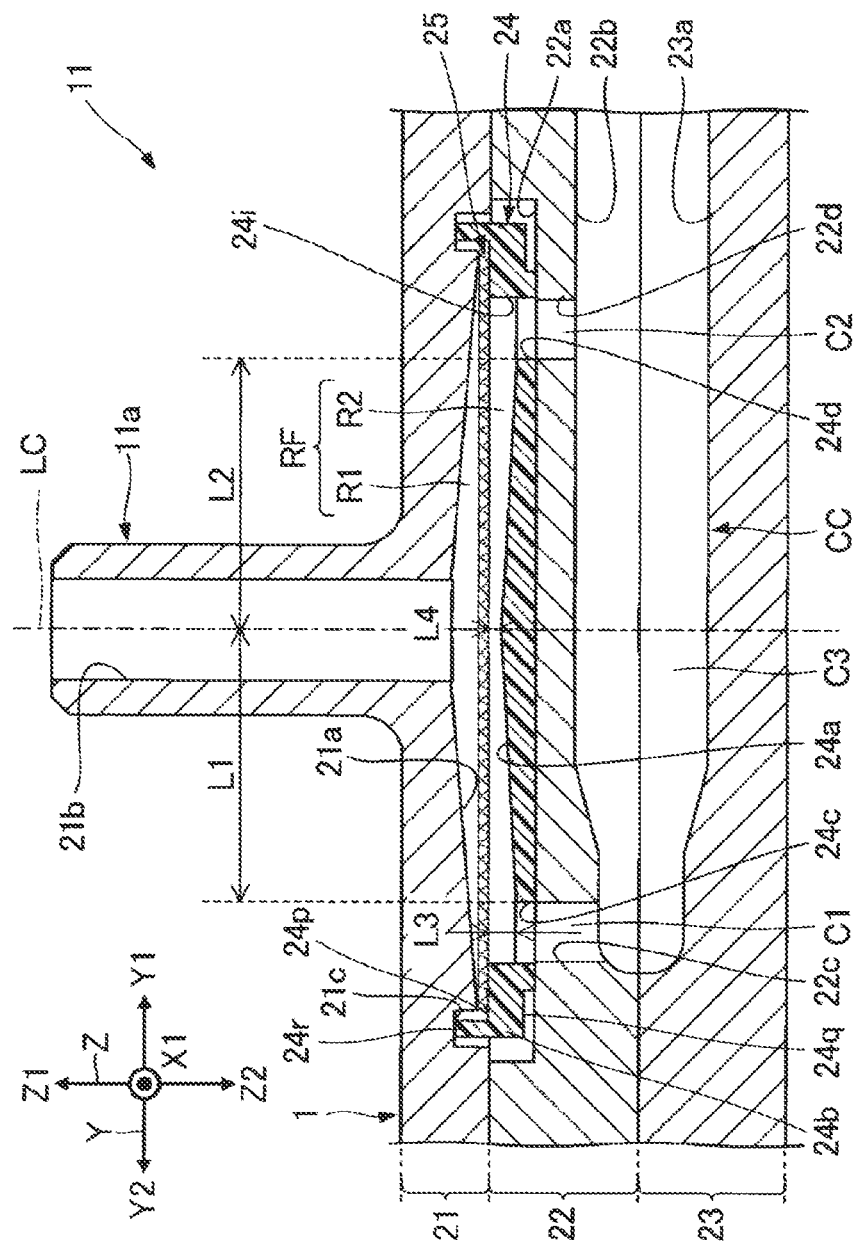
FIG. 7 is a sectional view taken along the line VII-VII of FIG. 6.

FIG. 7 is a sectional view taken along the line VII-VII of FIG. 6. In FIG. 7, regarding the flow passage member 1, a structure corresponding to the connection pipe 11a is illustrated. In FIG. 7, the illustration of adhesives such as an adhesive B1, an adhesive B2, and an adhesive Ba illustrated in FIG. 9, which will be described later, is omitted for easier view.

The structure corresponding to the connection pipe 11a is described below as a representative example. A structure corresponding to the connection pipe 11b is the same as the structure corresponding to the connection pipe 11a. A structure corresponding to the connection pipe 11c and a structure corresponding to the connection pipe 11d are the same as the structure corresponding to the connection pipe 11a except that a structure regarding the filter chamber RF is omitted and that the shape is different.

As illustrated in FIG. 7, the flow passage member 1 includes a stack of layers 21, 22, and 23 in this order as viewed toward Z2. Each of the layers 21, 22, and 23 is made of thermosetting resin, metal, or ceramic. Therefore, as compared with a case where each of the layers 21, 22, and 23 is made of thermoplastic resin, it is possible to increase the liquid resistance and rigidity of the layers 21, 22, and 23. The material of the layers 21, 22, and 23 may be the same as one another or different from one another. For example, one of the layers 21, 22, and 23 may be made of thermosetting resin, and the others may be made of metal or ceramic.

When the layer 21, 22, or 23 is made of thermosetting resin, the kind of the thermosetting resin is not specifically limited. Examples of the thermosetting resin used as the material include phenol resin, urea resin, melamine resin, epoxy resin, alkyd resin, unsaturated polyester resin, epoxy resin, diallyl phthalate resin, and the like. Any one of these kinds of the material may be used alone, or two or more of them may be used in combination in the form of a copolymer or a blend, etc. The thermosetting resin may contain, for example, a fiber base material such as glass fiber, or filler such as silica powder. Using such a fiber base material or filler makes it possible to improve the rigidity of the layer 21, 22, or 23 in comparison with a case where thermosetting resin only is used. The thermosetting resin may contain a coloring agent such as dye or pigment. Since using a coloring agent decreases the light transmittance of the thermosetting resin, it is possible to reduce the degradation of ink even if the ink is photo curable or even if the ink has low light resistance.

When the layer 21, 22, or 23 is made of metal, the kind of the metal is not specifically limited. Examples of the metal used as the material include aluminum, aluminum alloy, titanium, titanium alloy, iron, stainless steel, and the like. Any one of these kinds of the material may be used alone, or two or more of them may be used in combination in the form of a stack of layers, etc. When the layer 21, 22, or 23 is made of ceramic, the kind of the ceramic is not specifically limited. Examples of the ceramic used as the material include ceramic oxide such as alumina, silica, titania, zirconia, and the like, and ceramic nitride such as silicon nitride, aluminum nitride, titanium nitride, and the like. Any one of these kinds of the material may be used alone, or two or more of them may be used in combination in the form of a stack of layers, etc.

A recessed surface 21a, an inlet 21b, and a groove 21c are provided in the layer 21. The recessed surface 21a is provided in the surface, of the layer 21, facing in the Z2 direction. The recessed surface 21a constitutes a part of the wall surface of the filter chamber RF. In the example illustrated in FIG. 7, the recessed surface 21a has a sloped surface shape whose depth increases gradually toward the inlet 21b. The inlet 21b is a through hole that is open to the recessed surface 21a and is in communication with the internal space of the connection pipe 11a. In the example illustrated in FIG. 7, the connection pipe 11a and the layer 21 are configured integrally. Therefore, the connection pipe 11a is made of a resin material, similarly to the layer 21. The groove 21c is provided in the surface, of the layer 21, facing in the Z2 direction, along and outside the circumference of the recessed surface 21a. The groove 21c constitutes a space that accommodates a part of a fixing member 24, which will be described later. As another function, the groove 21c is able to serve as a space where an adhesive can escape.

The connection pipe 11a may be a separate part that is not integral with the layer 21. In this case, the connection pipe 11a may be made of metal, etc. The connection pipe 11a, in this case, is fixed to the layer 21 with an adhesive, etc. The groove 21c is not indispensable. If unnecessary, the groove 21c may be omitted.

A recess 22a, a groove 22b, a hole 22c, and a hole 22d are provided in the layer 22. The recess 22a is provided in the surface, of the layer 22, facing in the Z1 direction. The recess 22a constitutes a space that accommodates a part of the fixing member 24, which will be described later. The groove 22b is provided in the surface, of the layer 22, facing in the Z2 direction. The groove 22b constitutes a part of a flow passage C3 in the supply flow passage CC. In the example illustrated in FIGS. 6 and 7, the flow passage C3 extends along the Y axis and has a shape that includes a portion whose area size on an X-Z plane becomes narrower toward Y2. Therefore, the groove 22b has a shape that extends along the Y axis. Each of the holes 22c and 22d is a through hole that is open to the recess 22a and the groove 22b and goes through the layer 22. In the example illustrated in FIG. 7, the hole 22c is connected to the Y2-directional end of the groove 22b. The hole 22d is connected to the groove 22b at the Y1-directional position that is the opposite of the hole 22c.

A groove 23a is provided in the layer 23. The groove 23a is provided in the surface, of the layer 23, facing in the Z1 direction. The groove 23a constitutes a part of the flow passage C3. In the example illustrated in FIG. 7, the groove 23a has a shape that extends along the Y axis. In the example illustrated in FIG. 7, the groove 22b of the layer 22 and the groove 23a of the layer 23 make up the supply flow passage CC. However, the flow passage C3 may consist of one of the grooves 22b and 23a.

In addition to the layers 21, 22, and 23 described above, as illustrated in FIG. 7, the flow passage member 1 includes the fixing member 24 and the filter 25, which are provided between the layer 21 and the layer 22. In the description below, view in the direction in which the layer 22 and the fixing member 24 overlap with each other will be referred to as "plan view".

Figure 8:
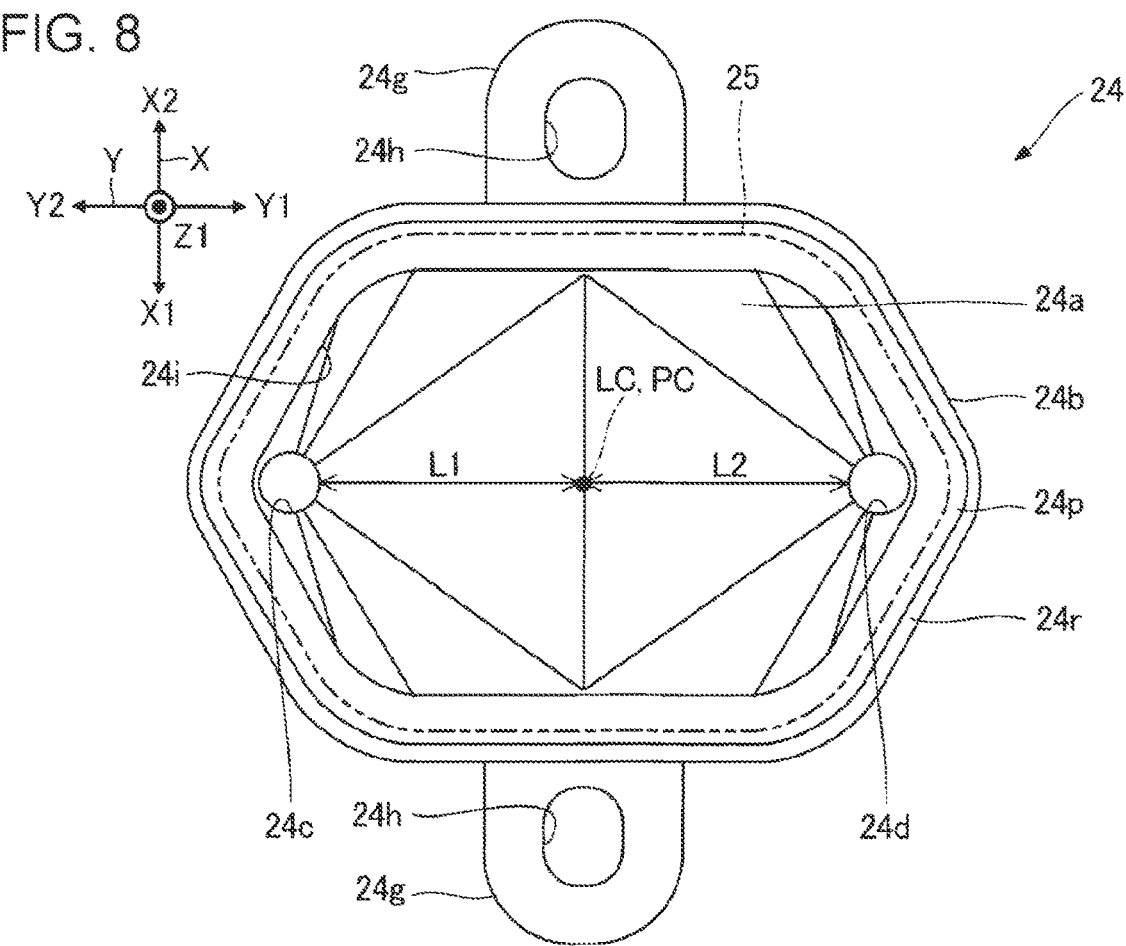
FIG. 8 is a plan view of a fixing member.
Figure 9:
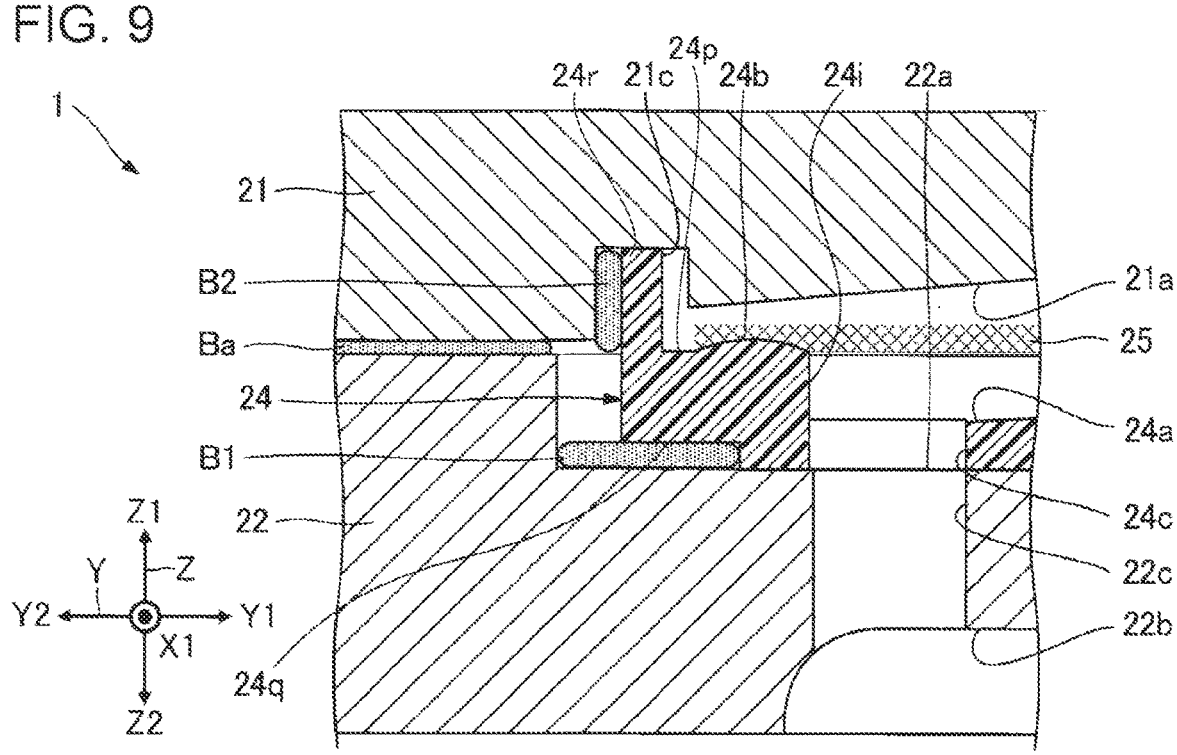
FIG. 9 is an enlarged sectional view for explaining a fix state of the fixing member and a filter according to the first embodiment.

FIG. 8 is a plan view of the fixing member 24. FIG. 9 is an enlarged sectional view for explaining a fix state of the fixing member 24 and the filter 25 according to the first embodiment. With reference to FIGS. 7, 8, and 9, the fixing member 24 and the filter 25 will now be explained.

As illustrated in FIG. 7, the fixing member 24 is a substantially-plate-like member that fixes the filter 25 to at least one of the layers 21 and 22 and constitutes a part of the wall surface of the filter chamber RF. In the example illustrated in FIG. 7, the fixing member 24 is provided in the recess 22a mentioned above.

As illustrated in FIG. 9, the fixing member 24 is fixed to the layer 22 with an adhesive B1, which is an example of "a first adhesive", and is fixed to the layer 21 with an adhesive B2, which is an example of "a second adhesive". Various kinds of adhesive can be used as the adhesive B1 and the adhesive B2 as long as it has resistance to ink and as long as the fixing member 24 is able to be bonded to the layer 21 or the layer 22 with it. Though not specifically limited, for example, an epoxy adhesive, a silicone adhesive, a P-aminophenol adhesive, and the like can be used. Among them, an epoxy adhesive is used preferably because of its advantage of excellent liquid resistance. Various kinds of photocurable adhesive such as a urethane adhesive may be used as the adhesive B1 and the adhesive B2. In this case, either a visible-light-curing adhesive or an ultraviolet-ray-curing adhesive may be used. However, for the purpose of avoiding adverse effects of heat applied in the curing process, an ultraviolet-ray-curing adhesive is preferable.

The adhesive B1 and the adhesive B2 may be the same as each other or different from each other. The adhesive B1 or the adhesive B2 may be the same as an adhesive Ba, with which the layer 21 is bonded to the layer 22, or different from the adhesive Ba. Any two or more of the adhesive B1, the adhesive B2, and the adhesive Ba may be integral. Either the adhesive B1 or the adhesive B2 may be omitted. However, using both the adhesive B1 and the adhesive B2 makes it possible to fix the fixing member 24 to the stack made up of the layers 21, 22, and 23 securely and makes it possible to reduce an unwanted clearance between the stack of these layers and the fixing member 24.

As described above, the filter 25 is fixed to at least one of the layers 21 and 22 by means of the fixing member 24. As compared with a structure in which the filter 25 is fixed to at least one of the layers 21 and 22 directly, this structure makes it possible to increase the freedom of choices in the material of the layer 21 and the material of the layer 22, and, in addition, makes it possible to reduce a risk of unintended sticking of the adhesive B1 or the adhesive B2 to the filter 25.

The fixing member 24 is made of a resin material and is formed by injection molding, for example. The material of the fixing member 24 may be the same as the material of the layer 21 or 22 or different therefrom.

The resin material of the fixing member 24 may be thermosetting resin or thermoplastic resin. However, whether the fixing member 24 is made of thermosetting resin or thermoplastic resin is determined depending on the shape, etc. of the fixing member 24. The resin material of the fixing member 24 may contain, for example, a fiber base material such as glass fiber, or filler such as silica powder. Using such a fiber base material or filler makes it possible to improve the rigidity of the fixing member 24 in comparison with a case where resin only is used.

If the fixing member 24 is made of thermosetting resin, as compared with a case where the fixing member 24 is made of thermoplastic resin, it is possible to increase the rigidity and liquid resistance of the fixing member 24.

The thermosetting resin used as the material of the fixing member 24 is not specifically limited. Examples include phenol resin, urea resin, melamine resin, epoxy resin, alkyd resin, unsaturated polyester resin, epoxy resin, diallyl phthalate resin, and the like, similarly to the layer 21, 22, or 23 described above. Any one of these kinds of the material may be used alone, or two or more of them may be used in combination in the form of a copolymer or a blend, etc.

If the fixing member 24 is made of thermoplastic resin, it is possible to fix the filter 25 to the fixing member 24 by welding. Therefore, using thermoplastic resin as the material of the fixing member 24 will be a good choice when it is difficult to form the fixing member 24 by insert molding with insertion of the filter 25 due to, for example, the shape of the fixing member 24. In the present embodiment, it is difficult to form the fixing member 24 by insert molding with insertion of the filter 25 because the filter 25 is disposed on the outer surface of the fixing member 24. Therefore, in the present embodiment, it is preferable to use thermoplastic resin as the material of the fixing member 24.

The thermoplastic resin used as the material of the fixing member 24 is not specifically limited. Examples include polyphenylene ether resin (PPE), modified polyphenylene ether resin (m-PPE), polyethylene resin (PE), polystyrene resin (PS), polyamide resin (PA), polyphenylene sulfide (PPS), polypropylene (PP), liquid crystal polymer (LCP) and acrylonitrile butadiene styrene resin (ABS resin), vinyl chloride-vinyl acetate copolymer resin, polyvinyl chloride resin, and the like. Any one of these kinds of the material may be used alone, or two or more of them may be used in combination in the form of a copolymer or a blend, etc. Among them, for example, polyolefin-based thermoplastic resin such as polypropylene is preferably used as the thermoplastic resin because it can be used for injection molding and has excellent chemical resistance.

A recess 24a, a frame portion 24b, a first outlet 24c, and a second outlet 24d are provided in the fixing member 24.

The recess 24a is provided in the surface, of the fixing member 24, facing in the Z1 direction. The recessed surface constitutes a part of the wall surface of the filter chamber RF. In the example illustrated in FIG. 7, the recess 24a has a sloped shape whose depth increases gradually toward each of the first outlet 24c and the second outlet 24d. The frame portion 24b is a loop-shaped wall portion formed along the contour of the recess 24a. The frame portion 24b constitutes the sidewall of the filter chamber RF. More specifically, a part of the inner surface of the frame portion 24b constitutes the sidewall 24i of a downstream chamber R2. The frame portion 24b has a placement surface 24p, on which the filter 25 is to be placed, a convex portion 24r, which protrudes from the placement surface 24p in the Z1 direction, and a cutout portion 24q. The placement surface 24p is the surface, of the frame portion 24b, facing in the Z1 direction. As illustrated in FIG. 8, the placement surface 24p has a loop shape that surrounds the recess 24a in plan view. As illustrated in FIG. 8, the convex portion 24r has a loop shape that surrounds the placement surface 24p in plan view. The cutout portion 24q is a loop-shaped cutout formed in a stepped manner at the most outer periphery of the frame portion 24b by recessing, in the Z1 direction, the surface of the frame portion 24b facing in the Z2 direction.

In the example illustrated in FIG. 7, the convex portion 24r of the frame portion 24b is inserted into the groove 21c mentioned above. The fixing member 24 is positioned with respect to the layer 21 as a result of this insertion. In addition, by being put into contact with the bottom of the groove 21c, the convex portion 24r of the frame portion 24b fulfills its function as a wall portion that prevents the adhesive B2 and the adhesive Ba from sticking to the filter 25. A clearance is formed between the outer surface of the frame portion 24b and the wall of the recess 22a. This clearance is able to serve as a space into which the adhesive B1 applied between the cutout portion 24q and the bottom surface of the recess 22a, the adhesive B2 applied between the outer surface of the convex portion 24r and the wall of the groove 21c, and the adhesive Ba are allowed to escape. Each of the first outlet 24c and the second outlet 24d is a through hole that is open to the recess 24a and goes through the fixing member 24. The first outlet 24c is connected to the hole 22c mentioned above. The first outlet 24c and the hole 22c constitute the first flow passage C1. The second outlet 24d is connected to the hole 22d mentioned above. The second outlet 24d and the hole 22d constitute the second flow passage C2.

As illustrated in FIG. 8, the fixing member 24 has flanges 24g protruding from the frame portion 24b away from the center line LC. The flanges 24g have holes 24h respectively for positioning with respect to the layer 22. On its surface facing in the Z1 direction, the layer 22 has protrusions that are inserted into the holes 24h respectively, though not illustrated. The center line LC is a straight line that goes through the center PC and is parallel to the Z axis. The center PC is the geometric center of the downstream chamber R2 in plan view. The flanges 24g are not indispensable. If unnecessary, the flanges 24g may be omitted.

The filter 25 is a plate-type or sheet-type member that catches a foreign object, etc. contained in ink while allowing the ink to pass through itself. The filter 25 is, for example, made of metal fibers having a twilled dutch weave pattern or a plain dutch weave pattern, etc. The material of the filter 25 is not limited to metal fibers. For example, resin fibers such as nonwoven fabric may be used.

The filter 25 is fixed to the frame portion 24b of the fixing member 24 described above. As indicated by the two-dot chain line in FIG. 8, the filter 25 is provided at an area that encompasses the entire area of the recess 24a. Therefore, as illustrated in FIG. 7, the filter chamber RF is partitioned by the filter 25 into an upstream chamber R1 and a downstream chamber R2. The upstream chamber R1 is a space that is located over the filter 25 in the Z1 direction. The recessed surface 21a constitutes a part of the wall surface of this upper space. The downstream chamber R2 is a space that is located under the filter 25 in the Z2 direction. The sidewall 24i and the recess 24a constitute a part of the wall surface of this lower space.

The filter 25 is fixed to the fixing member 24 without using an adhesive. Therefore, it is possible to prevent an adhesive from sticking to the filter 25. More specifically, if the fixing member 24 is formed by insert molding with insertion of the filter 25, the filter 25 is fixed to the fixing member 24 integrally. In this case, either thermosetting resin or thermoplastic resin may be used as the material of the fixing member 24. If the fixing member 24 is made of thermoplastic resin, the filter 25 may be fixed to the fixing member 24 by welding. In the present embodiment, as described earlier, it is difficult to form the fixing member 24 by insert molding with insertion of the filter 25. Therefore, it is preferable to use thermoplastic resin as the material of the fixing member 24 and to fix the filter 25 to the fixing member 24 by welding.

As described above, the flow passage member 1 includes the supply flow passage CC, the filter 25, the fixing member 24, and the layer 22. The layer 22 is an example of "a first member". As described earlier, ink, which is an example of "liquid", flows through the supply flow passage CC. The filter 25 is provided on a path of the supply flow passage CC. The ink passes through the filter 25. The fixing member 24 constitutes a part of the supply flow passage CC. The filter 25 is fixed to the fixing member 24. The layer 22 constitutes a part of the supply flow passage CC. The fixing member 24 is fixed to the layer 22.

The filter 25 is fixed indirectly to the layer 22 by means of the fixing member 24 disposed therebetween as described above. Therefore, as long as no adhesive is used for fixing the filter 25 to the fixing member 24, it is possible to avoid or reduce the sticking of an adhesive to the filter 25 even though the adhesive B1 is used for fixing the fixing member 24 to the layer 22.

Moreover, the fixing member 24 is made of thermoplastic resin, whereas the layer 22 is made of any of thermosetting resin, metal, and ceramic.

In general, the Young's modulus of each of thermosetting resin, metal, and ceramic is higher than that of thermoplastic resin. Since the flow passage member 1 includes the layer 22 that is made of any of thermosetting resin, metal, and ceramic, therefore, as compared with a structure in which the flow passage member 1 is made of thermoplastic resin only, it is possible to enhance the rigidity of the flow passage member 1.

Moreover, in general, the liquid resistance of each of thermosetting resin, metal, and ceramic is superior to that of thermoplastic resin. Since the flow passage member 1 includes the layer 22 that is made of any of thermosetting resin, metal, and ceramic, therefore, as compared with a structure in which the flow passage member 1 is made of thermoplastic resin only, it is possible to enhance the liquid resistance of the flow passage member 1. Furthermore, in general, the coefficient of linear expansion of each of thermosetting resin, metal, and ceramic is less than that of thermoplastic resin. Therefore, as compared with a case where thermoplastic resin is used, it is possible to reduce deformation such as warpage of the flow passage member 1 due to a temperature change. Consequently, it is possible to reduce the coming off of the adhesive in the flow passage member 1.

On the other hand, thermoplastic resin is able to be fixed to other member by welding. Therefore, it is possible to fix the filter 25 to the fixing member 24 by welding without using an adhesive. There are some types of thermoplastic resin that have excellent liquid resistance. Therefore, by choosing an appropriate type of thermoplastic resin as the material of the fixing member 24, it is possible to impart required liquid resistance to the flow passage member 1. The thermoplastic resin used as the material of the fixing member 24 does not necessarily have to be resistant to liquid. In this case, it is sufficient as long as surface treatment that imparts liquid resistance, for example, coating, is applied to the fixing member 24.

With the structure described above, it is possible to enhance the rigidity and liquid resistance of the flow passage member 1 while preventing an adhesive from sticking to the filter 25. Consequently, it is possible to provide the flow passage member 1 that offers greater reliability than that of related art.

In the present embodiment, the area size of the fixing member 24 in plan view is smaller than the area size of the layer 22 in plan view. For this reason, the influence of the rigidity of the fixing member 24 on the rigidity of the flow passage member 1 as a whole is less than the influence of the rigidity of the layer 22 on the rigidity of the flow passage member 1 as a whole. To put it the other way around, the influence of the rigidity of the layer 22 on the rigidity of the flow passage member 1 as a whole is greater than the influence of the rigidity of the fixing member 24 on the rigidity of the flow passage member 1 as a whole. For this reason, using any of thermosetting resin, metal, and ceramic as the material of the layer 22 makes it possible to enhance the rigidity of the flow passage member 1 as a whole, which is desirable. On the other hand, it can be said that the use of thermoplastic resin as the material of the fixing member 24 is not so much negatively influential on the rigidity of the flow passage member 1 as a whole.

As has already been explained, the fixing member 24 and the layer 22 are fixed to each other with the adhesive B1, which is an example of "a first adhesive". On the other hand, the fixing member 24 and the filter 25 are fixed to each other without using an adhesive, for example, by welding. Fixing the filter 25 to the fixing member 24 without using an adhesive and fixing the filter 25 indirectly to the layer 22 by means of the fixing member 24 disposed therebetween as described above makes it possible to prevent the mesh of the filter 25 from becoming clogged with the adhesive B1.

The method of welding is not specifically limited. Any method may be used as long as it is possible to fix the fixing member 24 and the filter 25 to each other. Examples include thermal welding, laser welding, and ultrasonic welding. In the present embodiment, thermal welding is used for fixing the fixing member 24 and the filter 25 to each other. If ultrasonic welding is used, it is necessary to configure the fixing member 24 as two thermoplastic resin members provided in such a way as to sandwich the filter 25 therebetween. If laser welding is used, it is necessary to configure the fixing member 24 as a pair of a light-transmissive resin member and a light-absorbing resin member that are made of thermoplastic resin and are provided in such a way as to sandwich the filter 25 therebetween. The light-transmissive resin used for laser welding is not limited to those that allow 100% of laser light to pass therethrough. The light-absorbing resin used for laser welding is not limited to those that absorb 100% of laser light. It is sufficient as long as the light absorption factor (or the light transmission factor) of one of the light-absorbing resin and the light-transmissive resin is different from that of the other for at least one wavelength of laser light and, in addition, as long as the light-transmissive resin is more transmissive than the light-absorbing resin. Therefore, the light absorption factor of the light-absorbing resin may be less than 100%, and the light transmission factor of the light-transmissive resin may be less than 100%. In order to perform laser welding stably, the light-transmissive resin should preferably allow laser light to pass at a transmittance of, for example, 20% or greater, and more preferably, 30% or greater.

If the adhesive B1 is a photo-curable adhesive, the fixing member 24 is preferably a member that has optical transparency. In this case, as compared with a case where the adhesive B1 is other kind of adhesive such as a thermosetting adhesive, it is possible to reduce the time taken for curing or solidification during the process of bonding using the adhesive B1. Therefore, it is possible to reduce the risk of flow of the adhesive B1 toward the filter 25 during the process of bonding. Moreover, since the fixing member 24 has optical transparency, it is possible to apply photo-curing light to the adhesive B1 through the fixing member 24. Therefore, even though the adhesive B1 has a portion that is located between the fixing member 24 and the layer 22, it is possible to photo-cure this portion. It is sufficient as long as the fixing member 24 has a certain degree of optical transparency that is enough for the curing of the adhesive B1 when photo-curing light is applied to the adhesive B1 through the fixing member 24. For example, if the adhesive B1 is an ultraviolet curable adhesive, it is sufficient as long as the fixing member 24 has a certain degree of optical transparency that is enough for the curing of the adhesive B1 when ultraviolet curing light is applied to the adhesive B1 through the fixing member 24. The same effects as those described above, or similar effects, can be expected also in a case where the adhesive B2 is a photo-curable adhesive.

Preferably, the adhesive B1 does not stick to, of the filter 25, a portion that contributes to fulfilling its filter function. In the present embodiment, the portion of the filter 25 that contributes to fulfilling its filter function is the portion where the filter 25 overlaps with the recess 24a in plan view. The fixing member 24 has the surface facing in the Z1 direction and the surface facing in the Z2 direction. In the present embodiment, the surface facing in the Z2 direction and the layer 22 are bonded to each other with the adhesive B1, whereas the filter 25 is fixed to the surface facing in the Z1 direction. Therefore, the adhesive B1 does not stick to the filter 25. Moreover, as described earlier, the frame portion 24b has a portion that is inserted into the groove 21c and, therefore, the adhesive B2 and the adhesive Ba also do not stick to the filter 25. Since none of the adhesives sticks to the filter 25, the risk of clogging the mesh of the filter 25 is extremely low.

As described earlier, the flow passage member 1 includes the layer 21, which is an example of "a second member". The layer 21 constitutes a part of the supply flow passage CC. The layer 21 is made of any of thermosetting resin, metal, and ceramic. The layer 21 is stacked on the layer 22, with the fixing member 24 disposed therebetween. Therefore, as compared with a structure in which the fixing member 24 is not disposed between the layer 21 and the layer 22, it is possible to enhance the rigidity of the flow passage member 1.

Similarly to the above-described comparison with the layer 22, the area size of the fixing member 24 in plan view is smaller than the area size of the layer 21 in plan view. For this reason, using any of thermosetting resin, metal, and ceramic as the material of the layer 21 makes it possible to enhance the rigidity of the flow passage member 1 as a whole, which is desirable. On the other hand, it can be said that the use of thermoplastic resin as the material of the fixing member 24 is not so much negatively influential on the rigidity of the flow passage member 1 as a whole.

As has already been explained, the fixing member 24 and the layer 21 are fixed to each other with the adhesive B2, which is an example of "a second adhesive". In the present embodiment, since the adhesive B2 is used in addition to the adhesive B1, as compared with a structure in which only one of the adhesive B1 and the adhesive B2 is used, it is possible to fix the fixing member 24 to the stack including the layers 21 and 22 securely.

As has already been explained, the fixing member 24 has the recess 24a, which is recessed from the surface to which the filter 25 is fixed. The bottom surface of the recess 24a constitutes a part of the supply flow passage CC and has the first outlet 24c and the second outlet 24d, which are through holes. Therefore, the fixing member 24 constitutes the floor of the downstream chamber R2. Because of this structure, as compared with a structure in which the fixing member 24 does not include the recess 24a, it is possible to make the distance between the filter 25 and the first outlet 24c and the distance between the filter 25 and the second outlet 24d shorter. Consequently, it is possible to discharge air bubbles that are present inside the downstream chamber R2 to the first outlet 24c and the second outlet 24d suitably.

As has already been explained, the supply flow passage CC includes the flow passage C3, which extends in the direction intersecting with the stack direction of the layer 22 and the filter 25. The flow passage C3 is provided in the layer 22. The layer 22, in which the flow passage C3 is provided, is relatively large in size in the direction intersecting with the stack direction of the layer 22 and the filter 25. In addition, since the flow passage C3 is provided, the cavity percentage of the layer 22 is high. Therefore, if the layer 22 were made of thermoplastic resin, its rigidity would tend to be insufficient. In this respect, since the layer 22 is made of any of thermosetting resin, metal, and ceramic, it is possible to prevent the rigidity of the layer 22 from being insufficient, although the flow passage C3 is provided in the layer 22. Moreover, there is the following advantage. When the layer 22 has the flow passage C3, the liquid-contact area size of the layer 22 in contact with ink increases. If the layer 22 were made of thermoplastic resin, the liquid resistance of which is lower than that of thermosetting resin, metal, and ceramic, the degradation of the layer 22 would be likely to occur. Therefore, there is a risk that a foreign object might be produced, or swelling might occur. In this respect, since the layer 22 is made of any of thermosetting resin, metal, and ceramic, it is possible to prevent the degradation of the layer 22 from occurring, although the flow passage C3 is provided in the layer 22.

In general, each of thermosetting resin, metal, and ceramic has excellent resistance not only to water-based ink but also to solvent ink and ultraviolet ray curing ink. If the ink that flows through the supply flow passage CC is ultraviolet ray curing ink or solvent ink, the ink contains a solvent. Therefore, if the flow passage member 1 were made of thermoplastic resin only, the flow passage member 1 would be susceptible to degradation caused by the solvent. In this respect, since at least a part of the flow passage member 1 is made of any of thermosetting resin, metal, and ceramic, even if solvent ink or ultraviolet ray curing ink is used as liquid that is to be ejected from the liquid ejecting head 10, it is possible to reduce degradation caused by the solvent ink or the ultraviolet ray curing ink.

As has already been explained, the liquid ejecting head 10 has a circulation flow passage through ink that was not ejected from the nozzles N after passing through the supply flow passage CC flows. At least a part of the discharge flow passage CM which constitutes a part of the circulation flow passage is provided in the layer 22. Therefore, the layer 22 constitutes a part of the circulation flow passage. The layer 22, in which a part of the circulation flow passage is provided, is relatively large in size in the direction intersecting with the stack direction of the layer 22 and the filter 25. In addition, since a part of the circulation flow passage is provided, the cavity percentage of the layer 22 is high. Therefore, if the layer 22 were made of thermoplastic resin, its rigidity would tend to be insufficient. In this respect, since the layer 22 is made of any of thermosetting resin, metal, and ceramic, it is possible to prevent the rigidity of the layer 22 from being insufficient, although a part of the circulation flow passage is provided in the layer 22. Moreover, there is the following advantage. When the layer 22 has a part of the circulation flow passage, the liquid-contact area size of the layer 22 in contact with ink increases. If the layer 22 were made of thermoplastic resin, the degradation of the layer 22 would be likely to occur. In this respect, since the layer 22 is made of any of thermosetting resin, metal, and ceramic, it is possible to prevent the degradation of the layer 22 from occurring, although a part of the circulation flow passage is provided in the layer 22.

The liquid resistance of each of thermoplastic resin, thermosetting resin, metal, and ceramic, etc. can be measured by experiment. Specifically, it is possible to quantitatively evaluate the liquid resistance by soaking a member such as a film having predetermined mass as a test piece in test target ink for a predetermined period of time and then by calculating a dissolution ratio based on a change in mass as a result of the soaking. By using the method described above, it is possible to measure the resistance of each material, for example, resistance to particular solvent-based ink, particular ultraviolet ray curing ink, and particular water-based ink.

1-6. Method for Manufacturing Flow Passage Member 1

Figure 10:
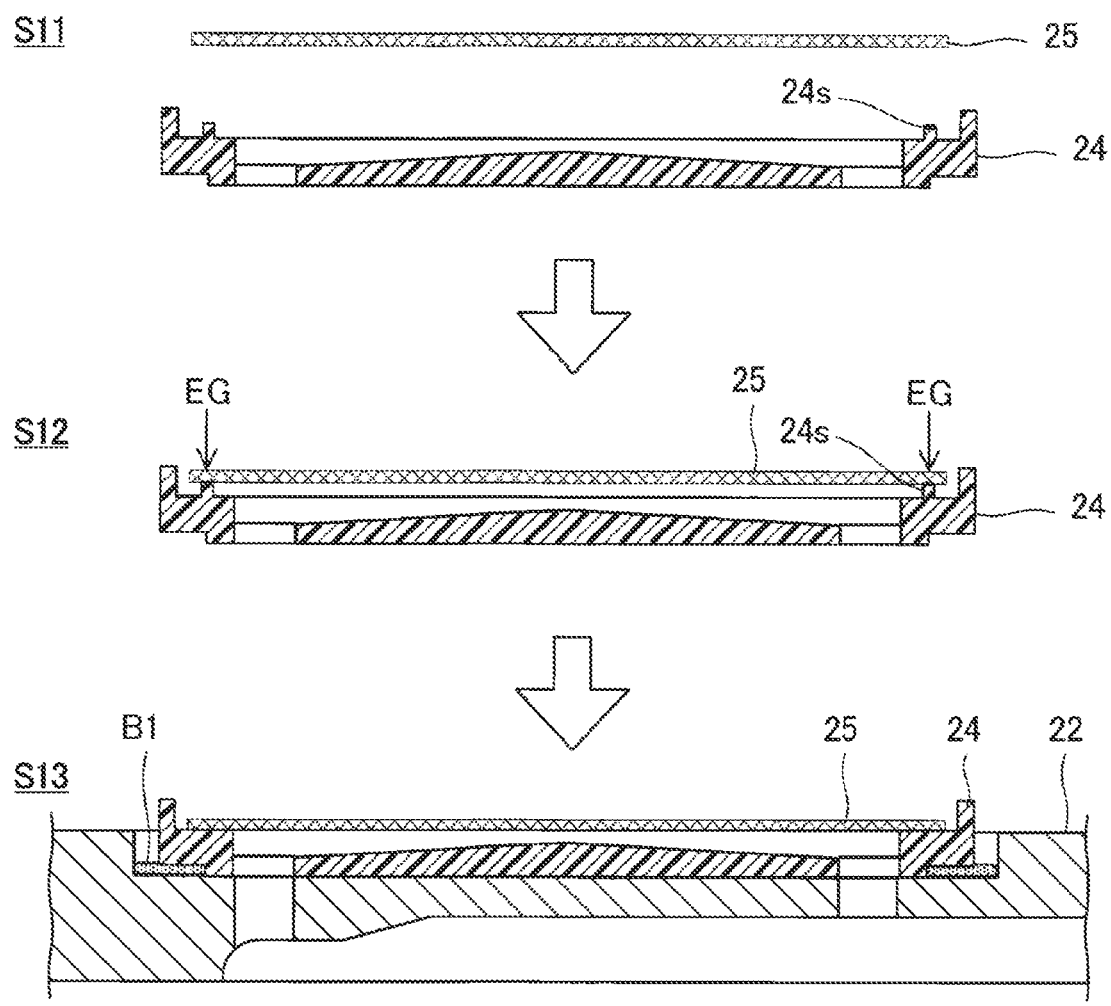
FIG. 10 is a diagram that illustrates the steps of manufacturing a flow passage member according to the first embodiment.

FIG. 10 is a diagram that illustrates the steps of manufacturing the flow passage member 1 according to the first embodiment. In FIG. 10, the steps of manufacturing the flow passage member 1 in a case where the filter 25 is fixed to the fixing member 24 by welding are illustrated. As illustrated in FIG. 10, the method for manufacturing the flow passage member 1 includes a preparation step S11, a welding step S12, and a bonding step S13. These steps are executed in this order.

In the preparation step S11, the fixing member 24 and the filter 25 are prepared. The fixing member 24 is formed by injection molding of thermoplastic resin. The fixing member 24 has a director 24s protruding from the placement surface 24p. Though not illustrated, the director 24s has a loop shape that surrounds the recess 24a as viewed in the direction in which the filter 25 is stacked on the fixing member 24. The filter 25 is obtained by cutting metal fibers having a twilled dutch weave pattern or a plain dutch weave pattern, etc.

Figure 12:
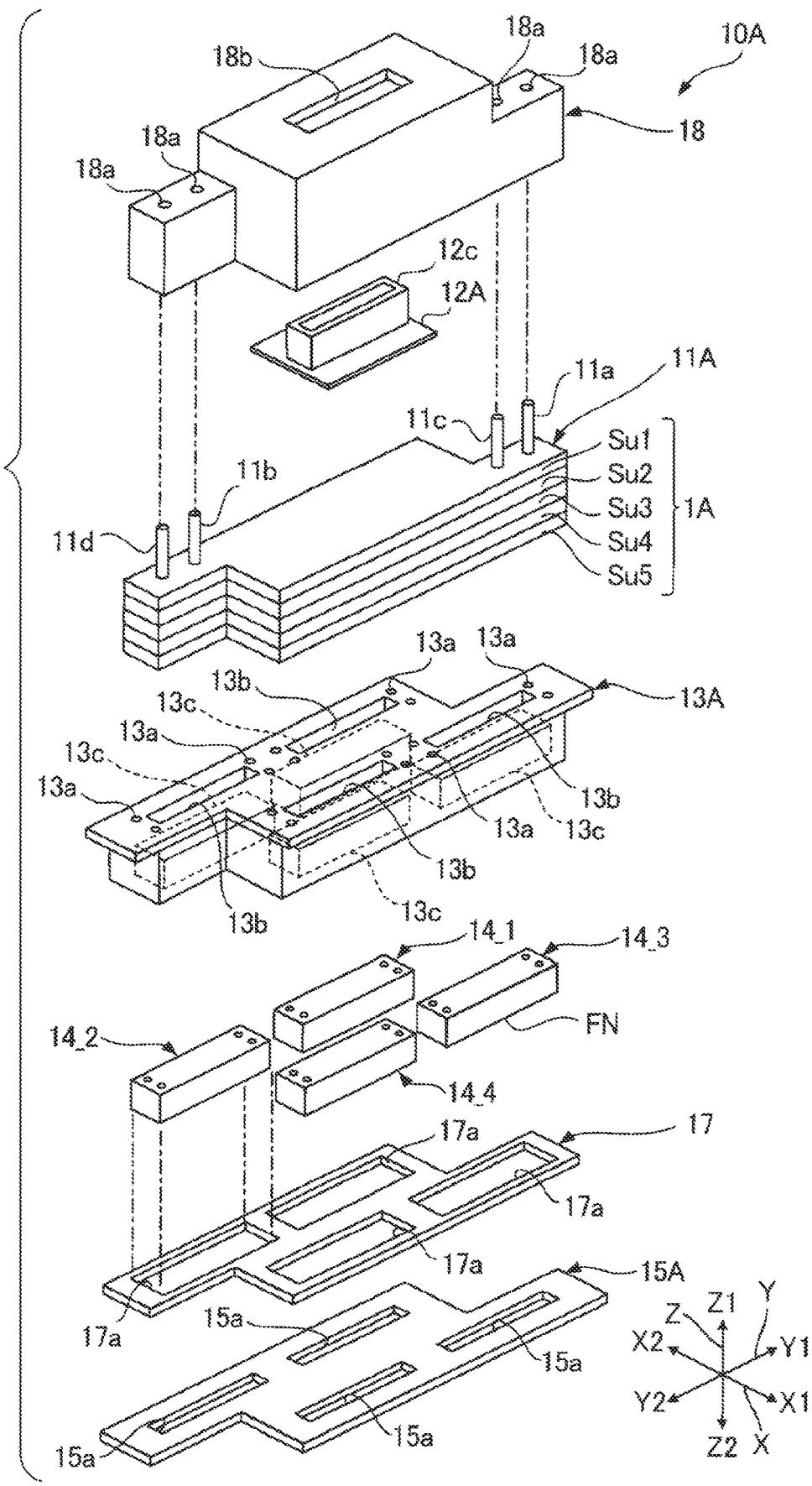
FIG. 12 is an exploded perspective view of the liquid ejecting head illustrated in FIG. 11.

In the welding step S12, the fixing member 24 and the filter 25 are fixed to each other by welding. Specifically, as illustrated in FIG. 12, after the filter 25 is placed on the director 24s of the fixing member 24, energy EG is applied to the fixing member 24 throughout the range of contact with the peripheral portion of the filter 25. In other words, the energy EG is applied to the director 24s. As a result of applying the energy EG, the director 24s melts, and the fixing member 24 and the filter 25 are welded to each other. The method of welding in the present embodiment is thermal welding. Therefore, the energy EG is heat.

In the bonding step S13, the fixing member 24 and the layer 22 are fixed to each other with the adhesive B1.

As explained above, in the method for manufacturing the flow passage member 1, the fixing member 24 and the layer 22 are bonded to each other with the adhesive B1 after welding the fixing member 24 and the filter 25 together. With the above method for manufacturing the flow passage member 1, it is possible to manufacture the flow passage member 1 that offers great reliability as described earlier.

In the first embodiment, the layer 22 is an example of "a first member", the layer 21 is an example of "a second member", the adhesive B1 is an example of "a first adhesive", and the adhesive B2 is an example of "a second adhesive". However, the layer 22 may be an example of "a second member", the layer 21 may be an example of "a first member", the adhesive B1 may be an example of "a second adhesive", and the adhesive B2 may be an example of "a first adhesive".

2. SECOND EMBODIMENT

A second embodiment of the present disclosure will now be explained. In the exemplary embodiment described below, the same reference numerals as those used in the description of the first embodiment are assigned to elements that are the same in operation and/or function as those in the first embodiment, and a detailed explanation of them is omitted.

Figure 11:
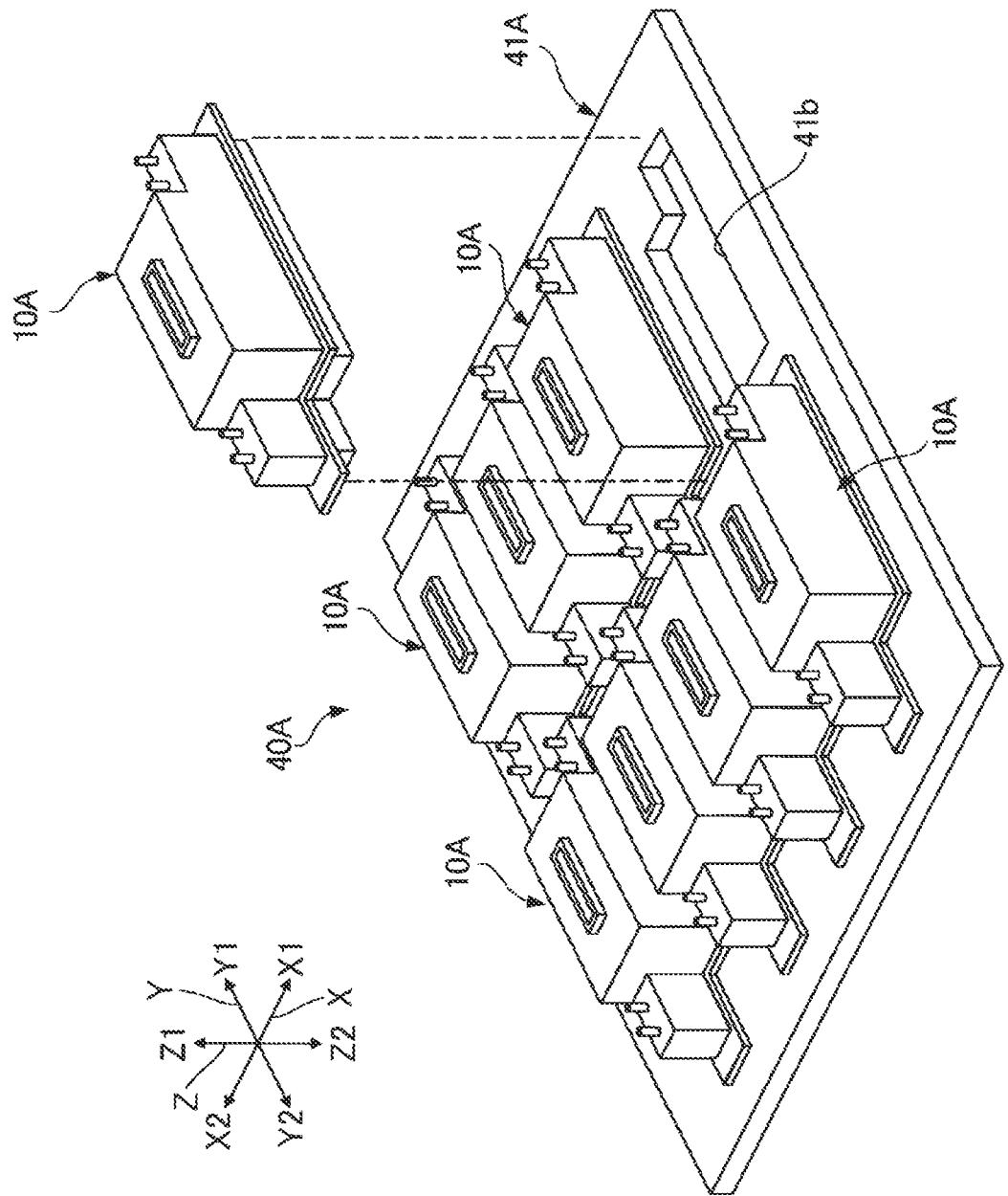
FIG. 11 is a perspective view of a liquid ejecting module that includes liquid ejecting heads according to a second embodiment.

FIG. 11 is a perspective view of a liquid ejecting module 40A that includes liquid ejecting heads 10A according to a second embodiment. As illustrated in FIG. 11, the liquid ejecting module 40A includes a support 41A and the plurality of liquid ejecting heads 10A. The support 41A is a member that supports the plurality of liquid ejecting heads 10A. In the example illustrated in FIG. 11, the support 41A is a plate-like member made of metal, etc. The support 41A has a plurality of mount holes 41b for mounting the plurality of liquid ejecting heads 10A. The liquid ejecting head 10A is inserted in each of the plurality of mount holes 41b. Each of the plurality of liquid ejecting heads 10A is fastened to the support 41A by screws, etc. In FIG. 11, the plural liquid ejecting heads 10A are arranged in a matrix along the X axis and the Y axis. The number of the liquid ejecting heads 10A included in the liquid ejecting module 40A is not limited to the example illustrated in FIG. 11. The liquid ejecting module 40A may include any number of the liquid ejecting heads 10A. The shape, etc. of the support 41A is also not limited to the example illustrated in FIG. 11. The support 41A may have any shape, etc.

FIG. 12 is an exploded perspective view of the liquid ejecting head 10A illustrated in FIG. 11. As illustrated in FIG. 12, the liquid ejecting head 10A includes a flow passage structure body 11A, a wiring board 12A, a holder 13A, head bodies 14_1, 14_2, 14_3, and 14_4, a fixing plate 15A, a reinforcing plate 17, and a cover 18. These components are disposed in the following order as viewed toward Z2: the cover 18, the wiring board 12A, the flow passage structure body 11A, the holder 13A, the head bodies 14_1, 14_2, 14_3, and 14_4, the reinforcing plate 17, and, finally, the fixing plate 15A. The components of the liquid ejecting head 10A will be described below sequentially.

The flow passage structure body 11A has the same structure as that of the flow passage structure body 11 according to the foregoing first embodiment except that, firstly, its stack is composed of layers Su1 to Su5, and, secondly, it has a different shape. Therefore, the flow passage structure body 11A has a structure regarding a filter, similarly to the flow passage structure body 11. This structure will be described in detail later. The layers Su1 to Su5 are made of any of thermosetting resin, metal, and ceramic. The layers Su1 to Su5 are fixed to each other with an adhesive. The layer Su3 is an example of "a first member". The layer Su2 is an example of "a second member".

The wiring board 12A is a mount component for electrically connecting the head bodies 14_1, 14_2, 14_3, and 14_4 to the control unit 20. For example, the wiring board 12A is a flexible wiring board or a rigid wiring board, etc. The wiring board 12A is disposed between the flow passage structure body 11A and the cover 18. The wiring board 12A has a surface facing the flow passage structure body 11A. On the surface that is the opposite of this surface, the connector 12c is provided. The connector 12c is a connection component for electric connection to the control unit 20. The wiring board 12A is electrically connected to the plurality of head bodies 14 via wiring that is not illustrated. The wiring is, for example, configured as a combination of a flexible wiring board and a rigid wiring board. The wiring may be configured as a part of the wiring board 12A integrally.

Except for a difference in shape, the holder 13A is the same as the holder 13 according to the foregoing first embodiment. The head bodies 14_1, 14_2, 14_3, and 14_4 are held by the holder 13A such that the direction in which the nozzles N belonging to the nozzle row La and the nozzles N belonging to the nozzle row Lb are arranged are parallel to the Y axis. Except for a difference in shape, the fixing plate 15A is the same as the fixing plate 15 according to the foregoing first embodiment. However, the reinforcing plate 17 is disposed between the holder 13A and the fixing plate 15A. In FIG. 12, a structure in which the holder 13A does not include any branch flow passage is illustrated.

The reinforcing plate 17 is a plate-like member for reinforcement of the fixing plate 15A. The reinforcing plate 17 is stacked on the fixing plate 15A and is fixed to the fixing plate 15A with an adhesive. The reinforcing plate 17 has a plurality of openings inside which the plurality of head bodies 14 is disposed. The reinforcing plate 17 is made of, for example, a metal material, etc.

The cover 18 is a box-type member that houses the flow passage member 1A of the flow passage structure body 11A and the wiring board 12A. The cover 18 is made of, for example, a resin material, etc. The cover 18 has four through holes 18*a* and an opening 18*b*. These four through holes 18*a* correspond to four connection pipes of the flow passage structure body 11A. The corresponding connection pipe 11*a*, 11*b*, 11*c*, or 11*d* is inserted through each of these four through holes 18*a*. The connector 12*c* is inserted through the opening 18*b* from the inside to the outside of the cover 18.

Figure 13:
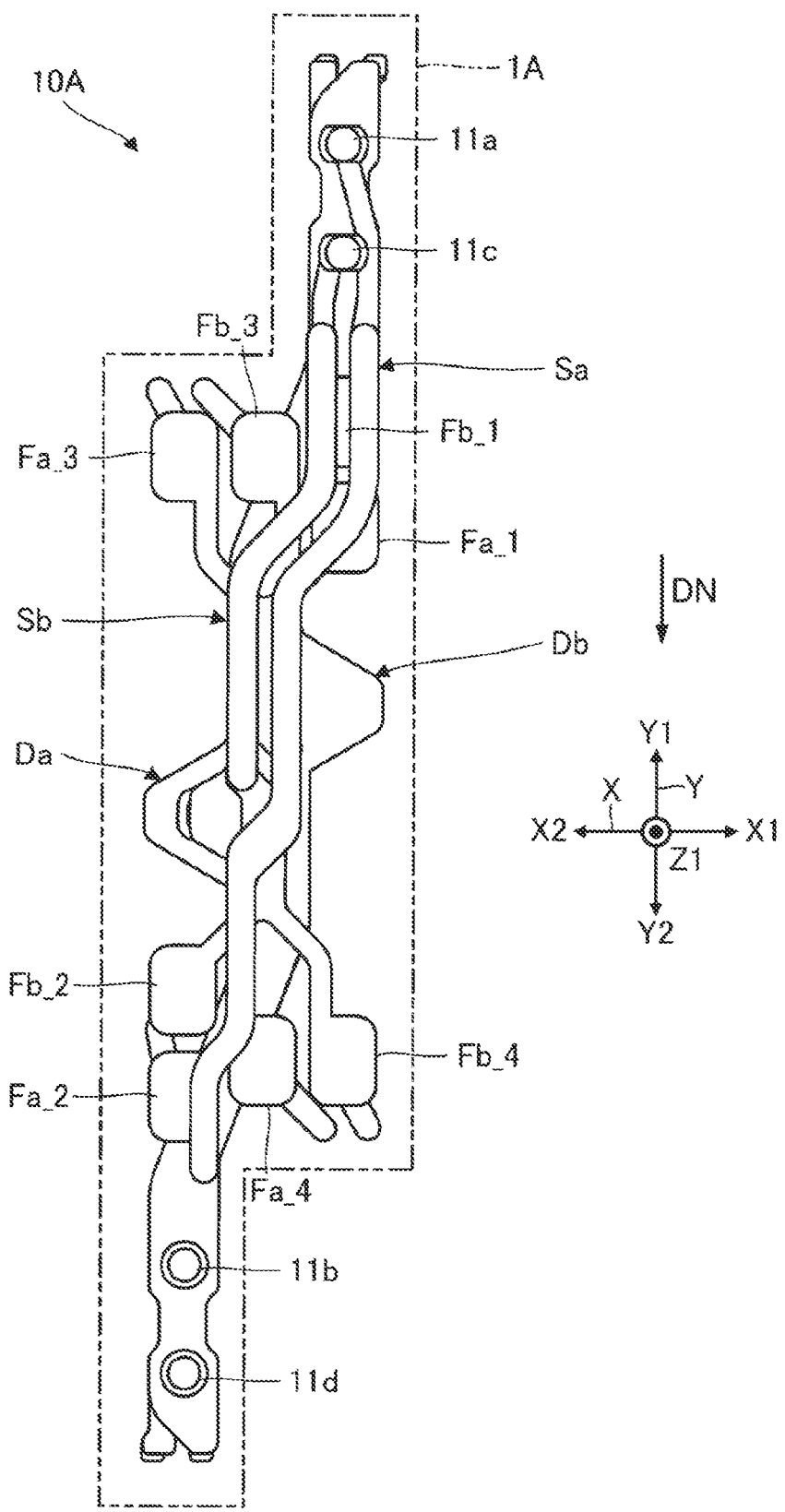
FIG. 13 is a diagram that illustrates the flow passages of a flow passage member according to the second embodiment.

FIG. 13 is a diagram that illustrates the flow passages of the flow passage member 1A according to the second embodiment. As illustrated in FIG. 13, a supply flow passage Sa, a discharge flow passage Da, a supply flow passage Sb, and a discharge flow passage Db are provided inside the flow passage member 1A. The supply flow passage Sa is a flow passage leading from the connection pipe 11*a* to the liquid reservoir Ra of each of the plurality of head bodies 14. The discharge flow passage Da is a flow passage leading from the liquid reservoir Ra of each of the plurality of head bodies 14 to the connection pipe 11*b*. The supply flow passage Sb is a flow passage leading from the connection pipe 11*c* to the liquid reservoir Rb of each of the plurality of head bodies 14. The discharge flow passage Db is a flow passage leading from the liquid reservoir Rb of each of the plurality of head bodies 14 to the connection pipe 11*d*. These flow passages are formed by providing grooves and through holes in the layers Su1 to Su5 described above.

As illustrated in FIG. 13, four filter portions Fa_1 to Fa_4 are provided for the supply flow passage Sa. Similarly, four filter portions Fb_1 to Fb_4 are provided for the supply flow passage Sb. The filter portion Fa_1 is described below as a representative example. The structure of the filter portions Fa_2, Fa_3, and Fa_4 is the same as that of the filter portion Fa_1.

Figure 14:
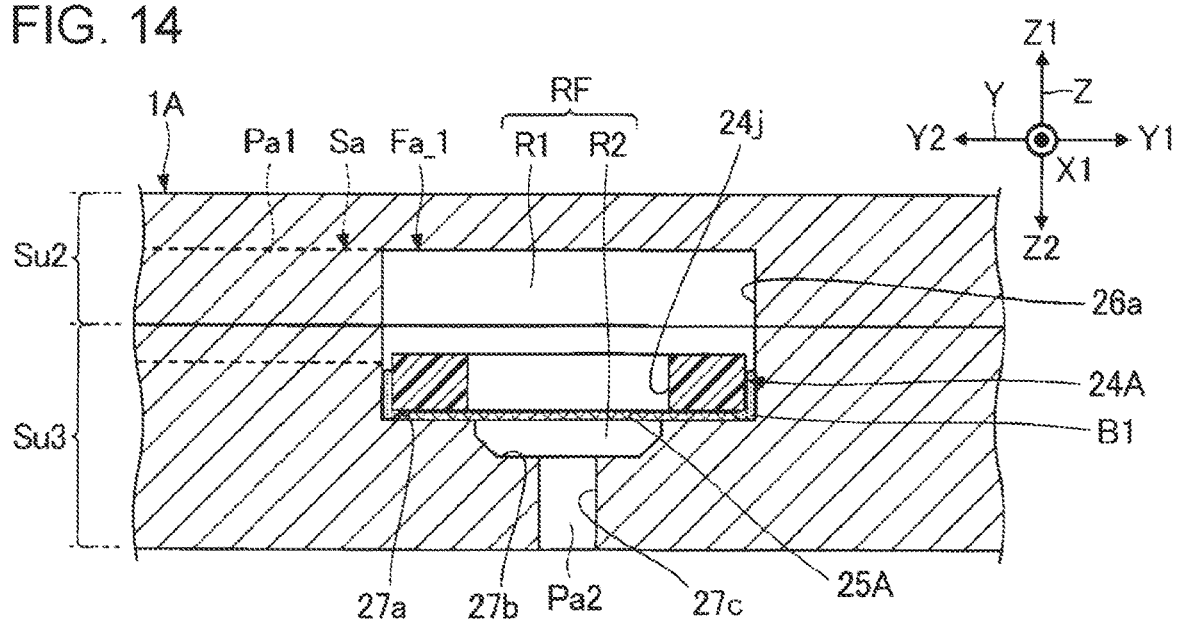
FIG. 14 is a sectional view of the flow passage member according to the second embodiment.

FIG. 14 is a sectional view of the flow passage member 1A according to the second embodiment. In the structure illustrated in FIG. 14, the filter portion Fa_1 is provided between the layer Su2 and the layer Su3. As illustrated in FIG. 14, the filter portion Fa_1 includes the filter chamber RF, a fixing member 24A, and a filter 25A.

In the present embodiment, the filter chamber RF is made up of a recess 26*a*, a recess 27*a*, and a recess 27*b*. The recess 26*a* is provided in the surface, of the layer Su2, facing in the Z2 direction. The recesses 27*a* and 27*b* are provided in the surface, of the layer Su3, facing in the Z1 direction. In the example illustrated in FIG. 14, the recess 27*a* is provided in the same area as the recess 26*a* in plan view. The recess 27*b* is provided in the bottom surface of the recess 27*a*. The recess 27*b* is provided in a narrower area inside the area of the recess 26*a* in plan view.

The fixing member 24A and the filter 25A are disposed inside the filter chamber RF and partition the filter chamber RF into the upstream chamber R1 and the downstream chamber R2. The upstream chamber R1 is in communication with the connection pipe 11*a* described above through a flow passage Pa1. The flow passage Pa1 is made up of a groove provided in the surface, of the layer Su2, facing in the Z2 direction, and a groove provided in the surface, of the layer Su3, facing in the Z1 direction, though not illustrated. The downstream chamber R2 is in communication with the head bodies 14 through a flow passage Pa2. The flow passage Pa2 is the internal space of a through hole 27*c* that is open to the bottom surface of the recess 27*a* and goes through the layer Su3.

Except for a difference in shape, the fixing member 24A is the same as the fixing member 24 according to the foregoing first embodiment. Except for a difference in shape, the filter 25A is also the same as the filter 25 according to the foregoing first embodiment. The fixing member 24A and the filter 25A will now be explained with a focus on the points of difference from the fixing member 24 and the filter 25.

Figure 15:
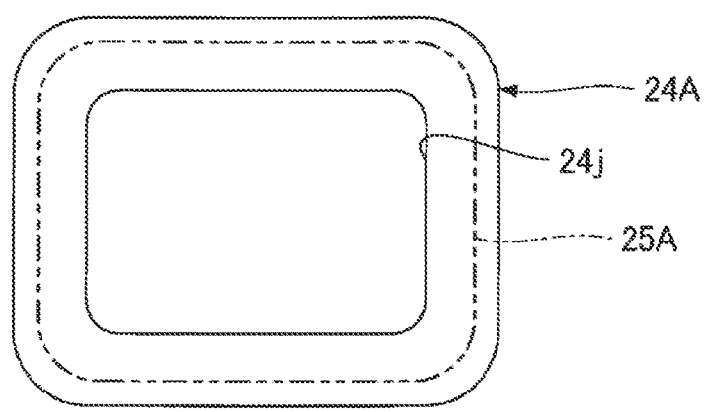
FIG. 15 is a plan view of a fixing member according to the second embodiment.
Figure 16:
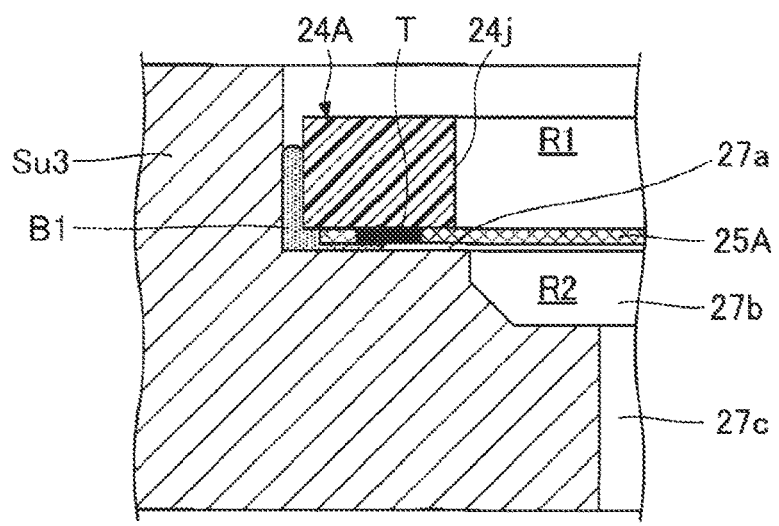
FIG. 16 is an enlarged sectional view for explaining a fix state of the fixing member and a filter according to the second embodiment.

FIG. 15 is a plan view of the fixing member 24A according to the second embodiment. FIG. 16 is an enlarged sectional view for explaining a fix state of the fixing member 24A and the filter 25A according to the second embodiment.

As illustrated in FIG. 15, the fixing member 24A has a frame shape in plan view. In the example illustrated in FIG. 15, each of the internal edge and the external edge of the fixing member 24A has a substantially quadrangular shape. The filter 25A has a quadrangular shape in plan view. The peripheral portion of the filter 25A is fixed to one surface of the fixing member 24A by welding, etc. without using an adhesive.

As illustrated in FIG. 16, a structure that is made up of the fixing member 24A and the filter 25A is disposed inside the recess 27*a*. Of the two surfaces of the fixing member 24A, the one surface to which the filter 25A is fixed is fixed to the layer Su3 with the adhesive B1. Therefore, an inner surface 24*j* of the fixing member 24A constitutes a part of the wall surface of the upstream chamber R1. It is possible to make the distance between the filter 25A and the flow passage Pa2 shorter because, of the two surfaces of the fixing member 24A, the one surface to which the filter 25A is fixed is fixed to the layer Su3 with the adhesive B1. Consequently, it is possible to discharge air bubbles that are present inside the downstream chamber R2 to the flow passage Pa2 suitably.

The adhesive B1 is applied not only to the fixing member 24A and the layer Su3 but also to an outer peripheral portion of the filter 25A that is a welded portion that does not have a filter function. The filter 25A has an area T, which is a painted-in-black area in the illustration of FIG. 16. The area T of the filter 25A depicts a portion where the mesh of the filter 25A is clogged due to the melting of the director of the fixing member 24A by welding. That is, no resin of the fixing member 24A that melted during the welding process is present in an inner portion that is more inside than the area T of the filter 25A and has a filter function and an outer peripheral portion that is more outside than the area T of the filter 25A. Therefore, by applying the adhesive B1 between the recess 27*a* and the outer peripheral portion that is more outside than the area T of the filter 25A, it is possible to strengthen the force of bonding with the adhesive B1 by anchoring effects taking advantage of the surface irregularities of the filter 25A. Moreover, the adhesive B1 is not applied to a region closer to the center of the filter 25A than the area T is, in plan view. Therefore, it is possible to reduce the risk of clogging the mesh of the filter 25A as a result of the flow of the adhesive B1 to the portion that has the filter function of the filter 25A due to capillary action. In FIG. 16, the adhesive B1 is applied between the area T of the filter 25A and the bottom surface of the recess 27a and is applied also to the outer peripheral portion that is more outside than the area T of the filter 25A. However, the adhesive B1 may be applied to the outer peripheral portion that is more outside than the area T of the filter 25A without being applied between the area T of the filter 25A and the bottom surface of the recess 27a.

The second embodiment described above makes it possible to provide the flow passage member 1A that offers great reliability, similarly to the foregoing first embodiment. Moreover, in the present embodiment, as described above, the fixing member 24A is a frame member that has a shape along the contour of the filter 25A. Therefore, as compared with the fixing member 24 according to the foregoing first embodiment, the fixing member 24A makes it possible to make the size of an area in contact with ink smaller. Therefore, even if thermoplastic resin is used as the material of the fixing member 24A so as to fix the filter 25A to the fixing member 24A by welding, it is possible to prevent the degradation or swelling of the fixing member 24A due to contact with solvent-based ink or ultraviolet ray curing ink, etc.

The fixing member 24A has one opening surrounded by the inner surface 24j. However, the fixing member 24A may have a plurality of openings. In other words, the fixing member 24A may have not only a frame portion that is along the contour of the filter 25A but also beams bridging therebetween. The fixing member 24A can be said as a frame member also in this case. In this case, a plurality of individual filters may be provided for the plurality of openings respectively.

Each of the supply flow passages Sa and Sb described above has a branch flow passage branching off therefrom as illustrated in FIG. 13. If the branch flow passages are formed in the layer Su3, the size of the layer Su3 will increase, and the cavity percentage of the layer Su3 will be high. Therefore, if the layer Su were made of thermoplastic resin, its rigidity would tend to be insufficient. In this respect, since the layer Su3 is made of any of thermosetting resin, metal, and ceramic, it is possible to prevent the rigidity of the layer Su3 from being insufficient, even if the branch flow passages are provided in the layer Su3. Moreover, there is the following advantage. If the layer Su3 has the branch flow passages, the liquid-contact area size of the layer Su3 in contact with ink increases. If the layer Su3 were made of thermoplastic resin, the degradation of the layer Su3 would be likely to occur. In this respect, since the layer Su3 is made of any of thermosetting resin, metal, and ceramic, it is possible to prevent the degradation of the layer Su3 from occurring, even if the branch flow passages are provided in the layer Su3.

Even when configured as in the second embodiment described above, it is possible to enhance the reliability of the flow passage member 1A, similarly to the foregoing first embodiment.

3. THIRD EMBODIMENT

A third embodiment of the present disclosure will now be explained. In the exemplary embodiment described below, the same reference numerals as those used in the description of the first embodiment are assigned to elements that are the same in operation and/or function as those in the first embodiment, and a detailed explanation of them is omitted.

Figure 17:
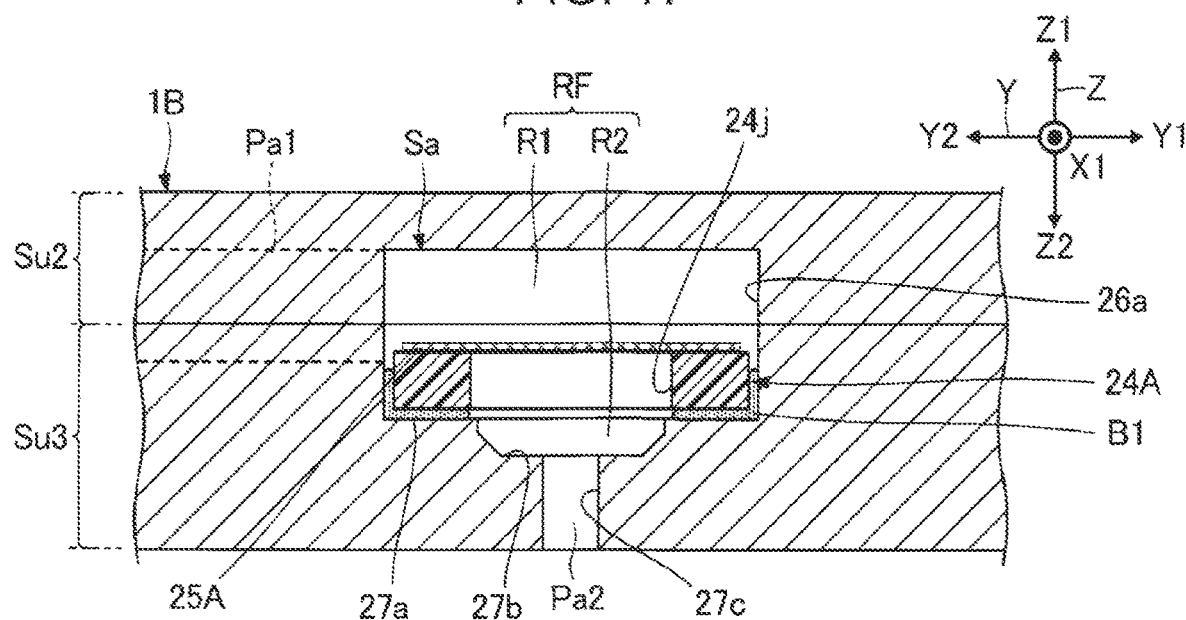
FIG. 17 is a sectional view of a flow passage member according to a third embodiment.

FIG. 17 is a sectional view of a flow passage member 1B according to the third embodiment. The flow passage member 1B is the same as the flow passage member 1A according to the foregoing second embodiment except that the installation orientation of the structure made up of the fixing member 24A and the filter 25A is inverted upside down. That is, in the flow passage member 1B, of the two surfaces of the fixing member 24A, the opposite one, which is the opposite of the one surface to which the filter 25A is fixed, is fixed to the layer Su3 with the adhesive B1.

Even when configured as in the third embodiment described above, it is possible to enhance the reliability of the flow passage member 1B, similarly to the foregoing first embodiment. Moreover, the present embodiment has an additional advantage that it is less likely that the adhesive B1 will stick to the filter 25A as compared with the second embodiment because, of the two surfaces of the fixing member 24A, the opposite one, which is the opposite of the one surface to which the filter 25A is fixed, is fixed to the layer Su3 with the adhesive B1.

In FIG. 17, for the purpose of increasing bonding strength, the adhesive B1 is applied between the opposite surface, which is the opposite of the one surface of the fixing member 24A to which the filter 25A is fixed, and the bottom surface of the recess 27a, and is applied also between the outer peripheral surface of the fixing member 24A and the inner wall surface of the recess 27a. However, the concept of the present embodiment is not limited to this example. The adhesive B1 may be applied only between the opposite surface, which is the opposite of the one surface of the fixing member 24A to which the filter 25A is fixed, and the bottom surface of the recess 27a. This structure has an advantage that it is less likely that the adhesive B1 will stick to the filter 25A as compared with the third embodiment.

4. FOURTH EMBODIMENT

A fourth embodiment of the present disclosure will now be explained. In the exemplary embodiment described below, the same reference numerals as those used in the description of the first embodiment are assigned to elements that are the same in operation and/or function as those in the first embodiment, and a detailed explanation of them is omitted.

Figure 18:
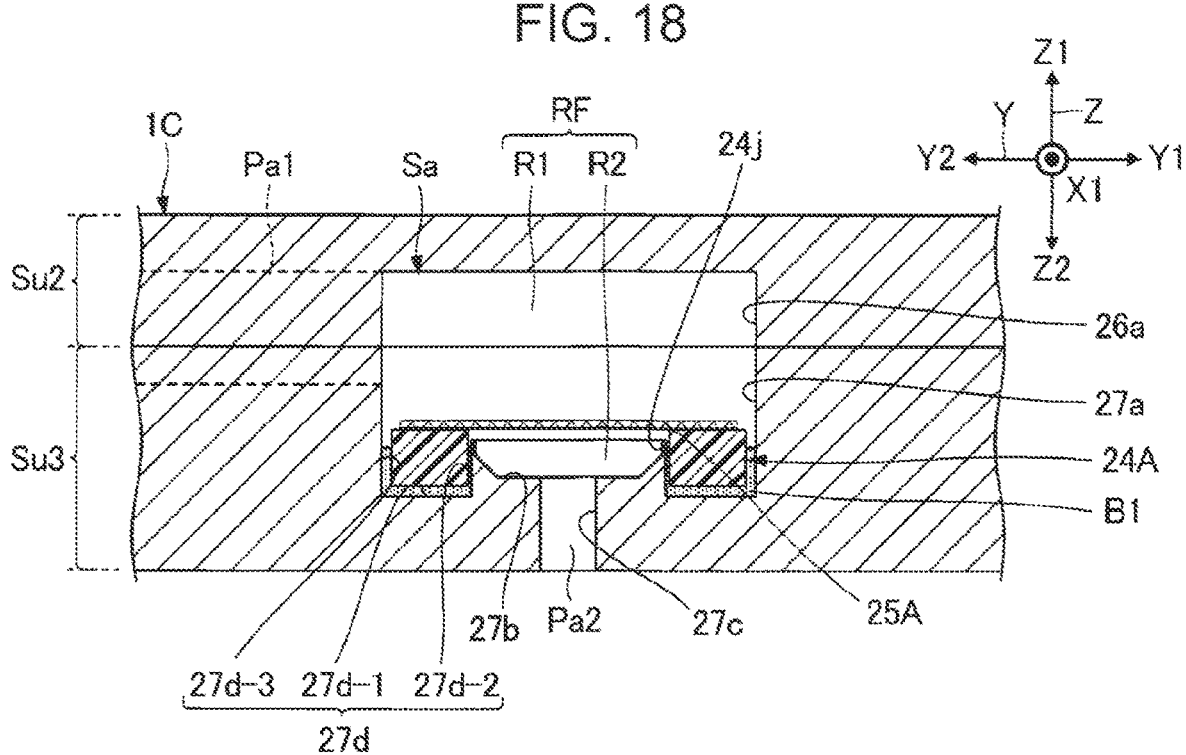
FIG. 18 is a sectional view of a flow passage member according to a fourth embodiment.

FIG. 18 is a sectional view of a flow passage member 1C according to the fourth embodiment. The flow passage member 1C is the same as the flow passage member 1B according to the foregoing third embodiment except that a recess 27d is provided in the layer Su3. The recess 27d is provided in the bottom surface of the recess 27a around the recess 27b. The recess 27d has a loop shape in plan view. The recess 27d has a bottom surface 27d-1, a first inner surface 27d-2, and a second inner surface 27d-3. The first inner surface 27d-2 is an inner surface of the recess 27d that is located closer to the center of the recess 27a than the second inner surface 27d-3 is. The Z2-directional end of the fixing member 24A is accommodated in the recess 27d. The fixing member 24A is fixed to the wall surfaces of the recess 27d with the adhesive B1. Specifically, the adhesive B1 is provided continuously between the opposite surface, which is the opposite of the one surface of the fixing member 24A to which the filter 25A is fixed, and the bottom surface 27d-1, and between the outer peripheral surface of the fixing member 24A and the second inner surface 27d-3, and between the inner peripheral surface of the fixing member 24A and the first inner surface 27d-2.

Even when configured as in the fourth embodiment described above, it is possible to enhance the reliability of the flow passage member 1C, similarly to the foregoing first embodiment. Moreover, in the present embodiment, it is possible to make the distance between the filter 25A and the flow passage Pa2 shorter because the fixing member 24A is disposed such that its end is accommodated in the recess 27d. Consequently, it is possible to discharge air bubbles that are present inside the downstream chamber R2 to the flow passage Pa2 suitably. Moreover, in the present embodiment, it is possible to increase the bonding strength of the fixing member 24A and the layer Su3 because the size of the area where the adhesive B1 is provided increases.

5. FIFTH EMBODIMENT

A fifth embodiment of the present disclosure will now be explained. In the exemplary embodiment described below, the same reference numerals as those used in the description of the first embodiment are assigned to elements that are the same in operation and/or function as those in the first embodiment, and a detailed explanation of them is omitted.

Figure 19:
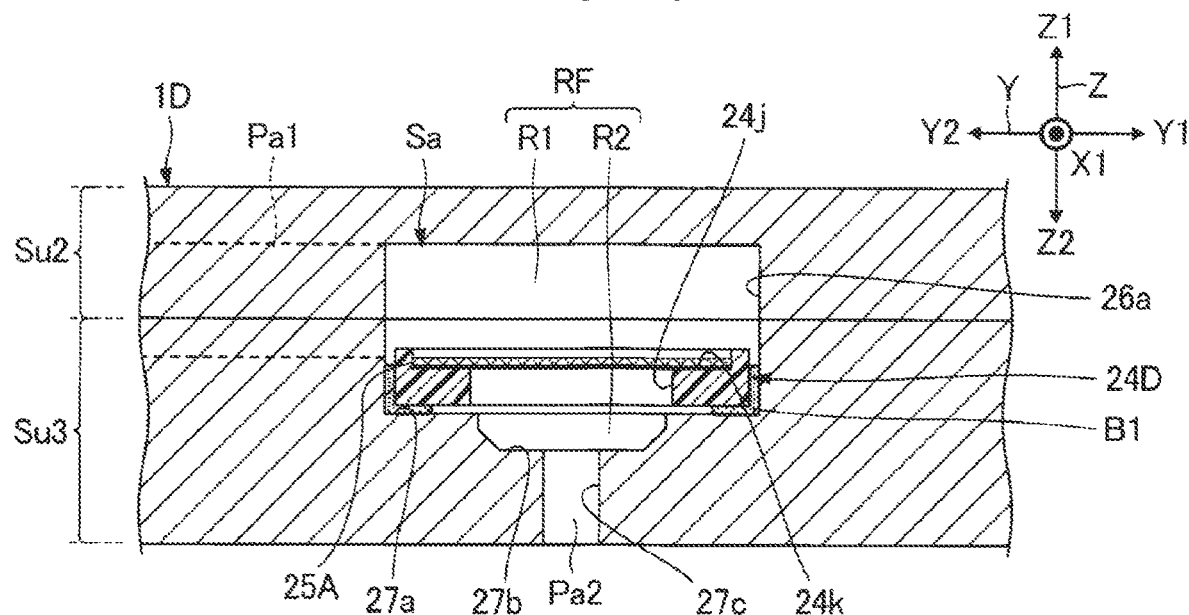
FIG. 19 is a sectional view of a flow passage member according to a fifth embodiment.

FIG. 19 is a sectional view of a flow passage member 1D according to the fifth embodiment. The flow passage member 1D is the same as the flow passage member 1B according to the foregoing third embodiment except that the flow passage member 1D includes a fixing member 24D in place of the fixing member 24A.

The fixing member 24D is the same as the fixing member 24A according to the foregoing third embodiment except that the fixing member 24D has a recess 24k inside which the filter 25A is disposed. The recess 24k is provided in the surface, of the fixing member 24D, facing in the Z1 direction. The recess 24k accommodates the filter 25A.

Even when configured as in the fifth embodiment described above, it is possible to enhance the reliability of the flow passage member 1D, similarly to the foregoing first embodiment. Moreover, in the present embodiment, it is possible to make the distance between the filter 25A and the flow passage Pa2 shorter because the filter 25A is disposed inside the recess 24k. Consequently, it is possible to discharge air bubbles that are present inside the downstream chamber R2 to the flow passage Pa2 suitably.

6. SIXTH EMBODIMENT

A sixth embodiment of the present disclosure will now be explained. In the exemplary embodiment described below, the same reference numerals as those used in the description of the first embodiment are assigned to elements that are the same in operation and/or function as those in the first embodiment, and a detailed explanation of them is omitted.

Figure 20:
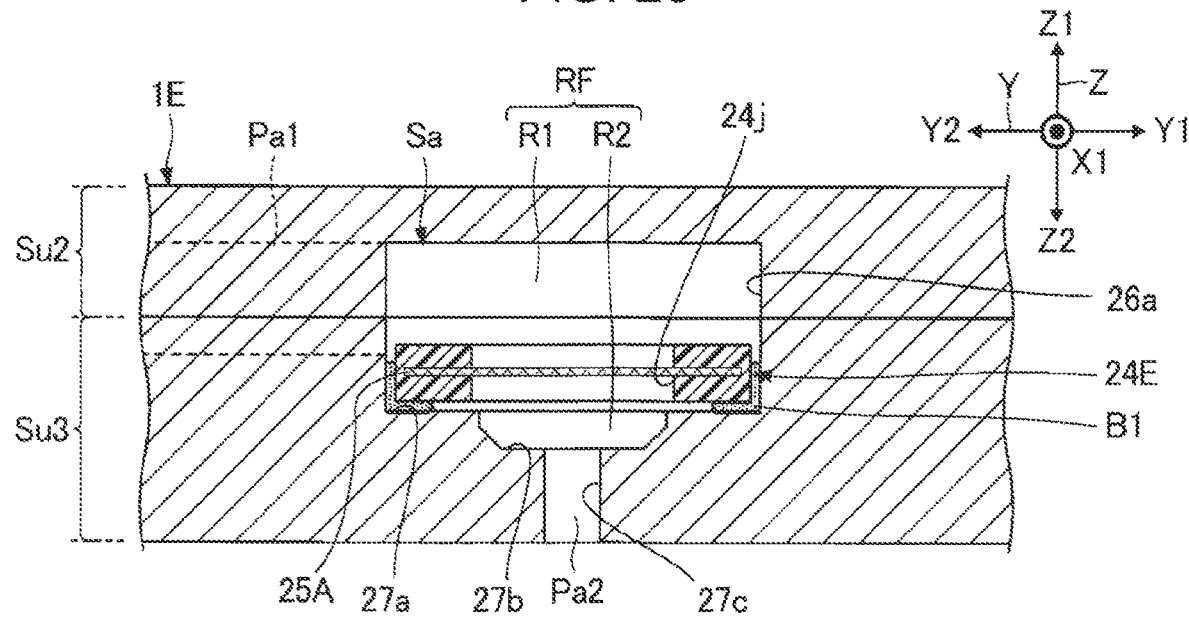
FIG. 20 is a sectional view of a flow passage member according to a sixth embodiment.

FIG. 20 is a sectional view of a flow passage member 1E according to the sixth embodiment. The flow passage member 1E is the same as the flow passage member 1A according to the foregoing second embodiment except that the flow passage member 1E includes a fixing member 24E in place of the fixing member 24A.

The fixing member 24E is the same as the fixing member 24A according to the foregoing second embodiment except that the filter 25A is fixed inside at a certain internal position in the thickness direction of the fixing member 24E. The fixing member 24E is molded integrally with the filter 25A by being formed by insert molding with insertion of the filter 25A.

As described above, in the flow passage member 1E, the fixing member 24E is formed by insert molding with insertion of the filter 25A. That is, the fixing member 24E and the filter 25A are molded integrally by insert molding. Therefore, it is possible to fix the fixing member 24E and the filter 25A to each other without using an adhesive. The layer Su3, which is an example of "a first member", and the fixing member 24E are fixed to each other with the adhesive B1.

Figure 21:
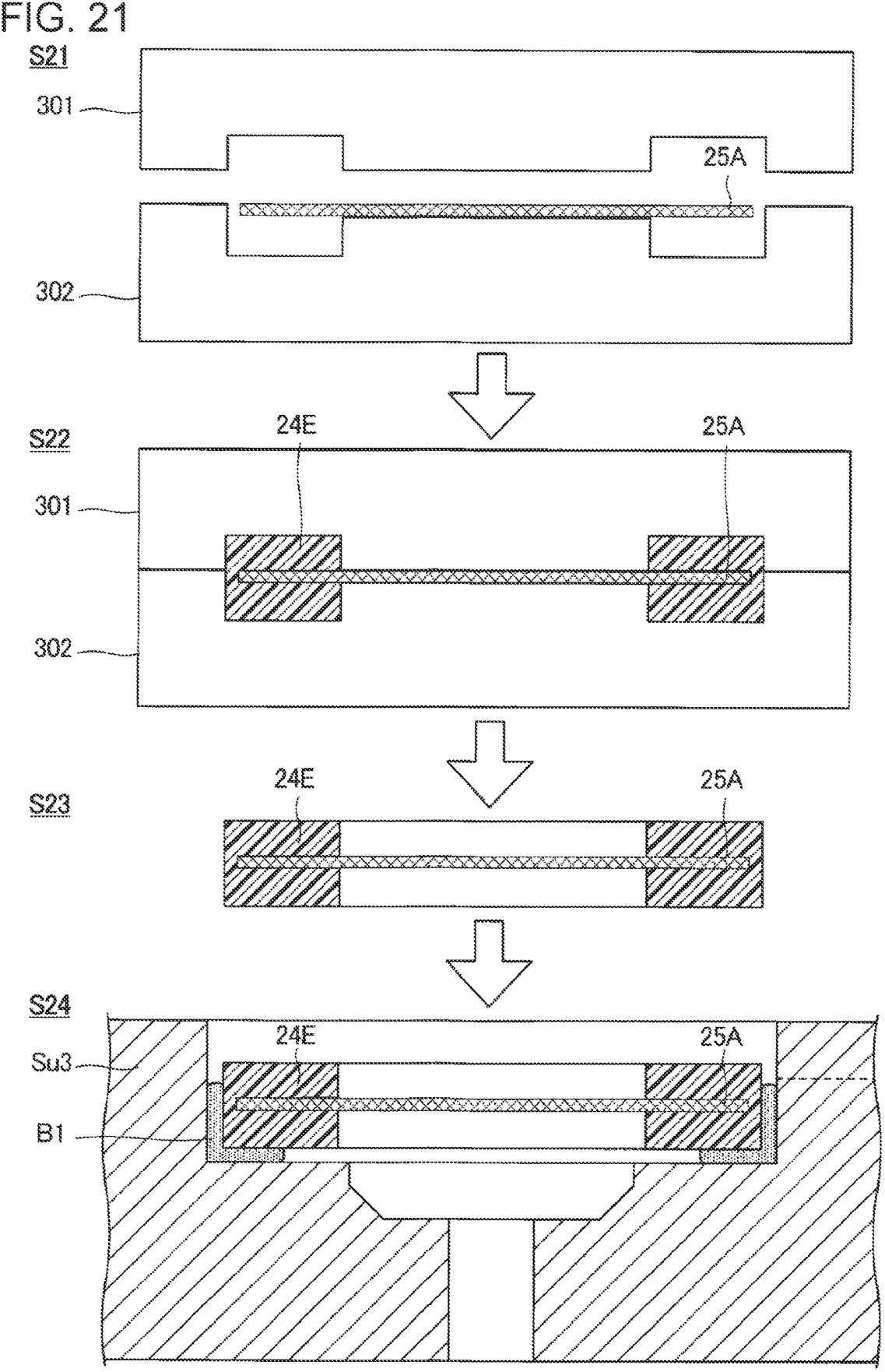
FIG. 21 is a diagram that illustrates the steps of manufacturing a flow passage member according to a sixth embodiment.

FIG. 21 is a diagram that illustrates the steps of manufacturing the flow passage member 1E according to the sixth embodiment. In FIG. 21, the steps of manufacturing the flow passage member 1E in a case where the fixing member 24E and the filter 25A are fixed to each other by insert molding are illustrated. As illustrated in FIG. 21, the method for manufacturing the flow passage member 1E includes an insert step S21, a molding step S22, a release step S23, and a bonding step S24. These steps are executed in this order.

In the insert step S21, in a state in which molding dies 301 and 302 are opened, the filter 25A is inserted as an inserted article at a desired position between these dies.

In the molding step S22, in a state in which molding dies 301 and 302 are closed, the cavity inside the dies is filled with resin. The resin may be thermoplastic resin, thermosetting resin. The thermosetting resin will be advantageous from the viewpoint of liquid resistance and rigidity. If the resin is thermoplastic resin, the fixing member 24E inside which the filter 25A is fixed can be obtained by filling the cavity inside the dies with thermoplastic resin softened by heating and thereafter by cooling the molten thermoplastic resin for solidification. If the resin is thermosetting resin, the fixing member 24E inside which the filter 25A is fixed can be obtained by filling the cavity inside the dies with thermosetting resin that has fluidity before curing and thereafter by curing the thermosetting resin by curing action.

In the release step S23, the fixing member 24E obtained through the steps described above is released from the molding dies 301 and 302.

In the bonding step S24, the fixing member 24E and the layer Su3 are fixed to each other with the adhesive B1 as done in the bonding step S13 of the foregoing first embodiment.

As explained above, in the method for manufacturing the flow passage member 1E, the fixing member 24E and the layer Su3 are bonded to each other with the adhesive B1 after forming the fixing member 24E by insert molding with insertion of the filter 25A. With the above method for manufacturing the flow passage member 1E, it is possible to manufacture the flow passage member 1E that offers great reliability as described earlier. Moreover, if the fixing member 24E is made of thermosetting resin, as compared with a case where the fixing member 24E is made of thermoplastic resin, it is possible to increase the rigidity and liquid resistance of the fixing member 24E.

Even when configured as in the sixth embodiment described above, it is possible to enhance the reliability of the flow passage member 1E, similarly to the foregoing first embodiment. Moreover, in the present embodiment, it is possible to make the distance between the filter 25A and the flow passage Pa2 shorter because the filter 25A is fixed inside at a certain internal position in the thickness direction of the fixing member 24E. Consequently, it is possible to discharge air bubbles that are present inside the downstream chamber R2 to the flow passage Pa2 suitably.

7. VARIATION EXAMPLES

The embodiments described as examples above can be modified in various ways. Some specific examples of modification that can be applied to the embodiments described above are described below. Two or more variation examples selected arbitrarily from the description below may be combined as long as they are not contradictory to each other or one another.

7-1. First Variation Example

Figure 22:
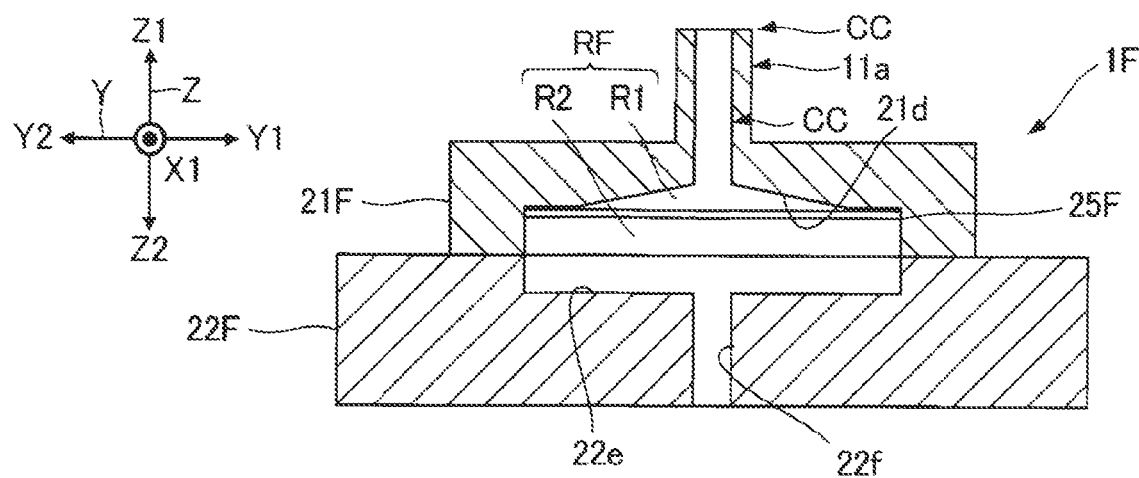
FIG. 22 is a sectional view of a flow passage member according to a first variation example.

FIG. 22 is a sectional view of a flow passage member 1F according to a first variation example. The flow passage member 1F includes a layer 21F, which is an example of "a fixing member", a layer 22F, which is an example of "a first member", and a filter 25F. The layers 21F and 22F constitute a stack of layers in this order as viewed toward Z2 and are fixed to each other with an adhesive. In plan view, the area size of the layer 21F is smaller than the area size of the layer 22F. The layer 21F is made of thermoplastic resin. The layer 22F is made of thermosetting resin, metal, or ceramic.

The filter 25F is disposed inside a space formed between the layer 21F and the layer 22F. The layer 21F has a recess 21d that is provided in its surface facing in the Z2 direction. The layer 22F has a recess 22e that is provided in its surface facing in the Z1 direction. The recess 21d and the recess 22e constitute the filter chamber RF. The filter 25F is disposed inside the recess 21d. The filter 25F is fixed to the layer 21F by welding, etc., without using an adhesive.

The filter 25F partitions the filter chamber RF into the upstream chamber R1 and the downstream chamber R2. The connection pipe 11a is provided on the layer 21F. The connection pipe 11a is in communication with the upstream chamber R1. An outlet 22f that is open to the downstream chamber R2 is provided in the layer 22F. Even when configured as in the first variation example described above, the same effects as those of the foregoing exemplary embodiments, or similar effects, can be obtained. The outlet 22f only, instead of forming both of the outlet 22f and the recess 22e, may be formed in the layer 22F.

As described above, in plan view, the area size of the layer 21F is smaller than the area size of the layer 22F. Therefore, even if the layer 21F is made of thermoplastic resin, it is possible to suppress a decrease in the rigidity of the flow passage member 1F as a whole. Not only the layer 21F on which the connection pipe 11a is formed but also a plurality of layers 21F on which the connection pipes 11b, 11c, and 11d are formed respectively may be stacked on the layer 22F with an adhesive. Even if the structure is modified in this way, it is possible to suppress a decrease in the rigidity of the flow passage member 1F as long as the layer 22F, the area size of which is larger than that of each of the layers 21F in plan view, is made of thermosetting resin. In plan view, the area size of the layer 21F may be approximately the same as the area size of the layer 22F. The meaning of "the area size of the layer 21F is approximately the same as the area size of the layer 22F" encompasses cases where the area size of the layer 21F is 90% or more but less than 110% of the area size of the layer 22F.

7-2. Second Variation Example

Figure 23:
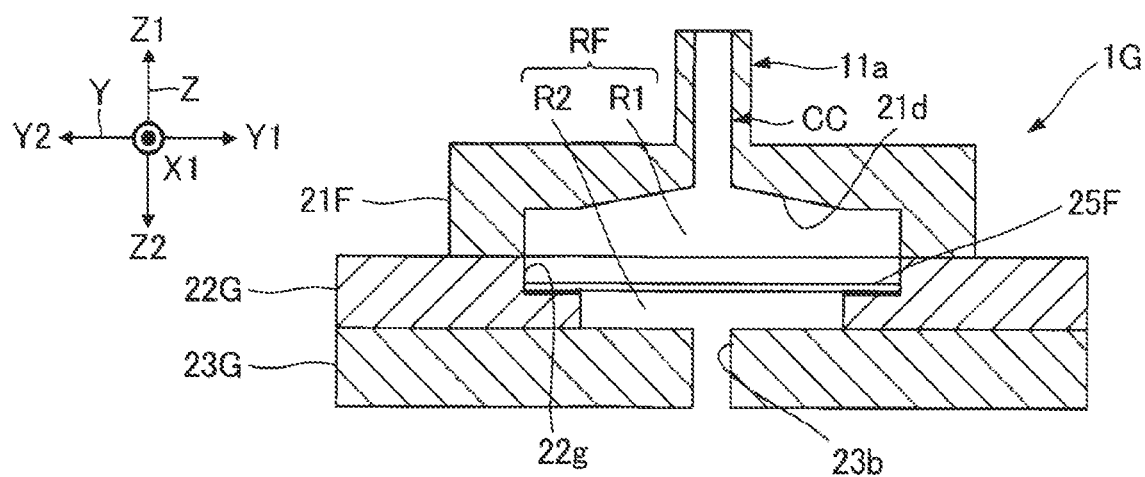
FIG. 23 is a sectional view of a flow passage member according to a second variation example.

FIG. 23 is a sectional view of a flow passage member 1G according to a second variation example. The flow passage member 1G is the same as the flow passage member 1F according to the first variation example described above except that, firstly, the flow passage member 1G includes a layer 22G and a layer 23G in place of the layer 22F and, secondly, the position where the filter 25F is disposed is different from that of the first variation example described above. That is, the flow passage member 1G includes the layer 21F, which is an example of "a first member", the layer 22G, which is an example of "a fixing member", the layer 23G, which is an example of "a second member", and the filter 25F. The layer 21F can be an example of "a second member", too. If the layer 21F is an example of "a second member", the layer 23G becomes an example of "a first member". The layers 21F, 22G, and 23G constitute a stack of layers in this order as viewed toward Z2 and are fixed to each other with an adhesive. Each of the layers 21F and 23G is made of thermosetting resin, metal, or ceramic. The layer 22G is made of thermoplastic resin.

The filter 25F is disposed inside a space formed between the layer 21F and the layer 22G. The layer 21F has the recess 21d that is provided in its surface facing in the Z2 direction. The layer 22G has a through-hole opening 22g. The recess 21d, the opening 22g, and the surface of the layer 23G facing in the Z1 direction constitute the filter chamber RF. The filter 25F is disposed inside the opening 22g. The filter 25F is fixed to the layer 22G by welding, etc., without using an adhesive.

The filter 25F partitions the filter chamber RF into the upstream chamber R1 and the downstream chamber R2. The connection pipe 11a is provided on the layer 21F. The connection pipe 11a is in communication with the upstream chamber R1. An outlet 23b that is open to the downstream chamber R2 is provided in the layer 23G. Even when configured as in the second variation example described above, the same effects as those of the foregoing exemplary embodiments, or similar effects, can be obtained.

7-3. Third Variation Example

Figure 24:
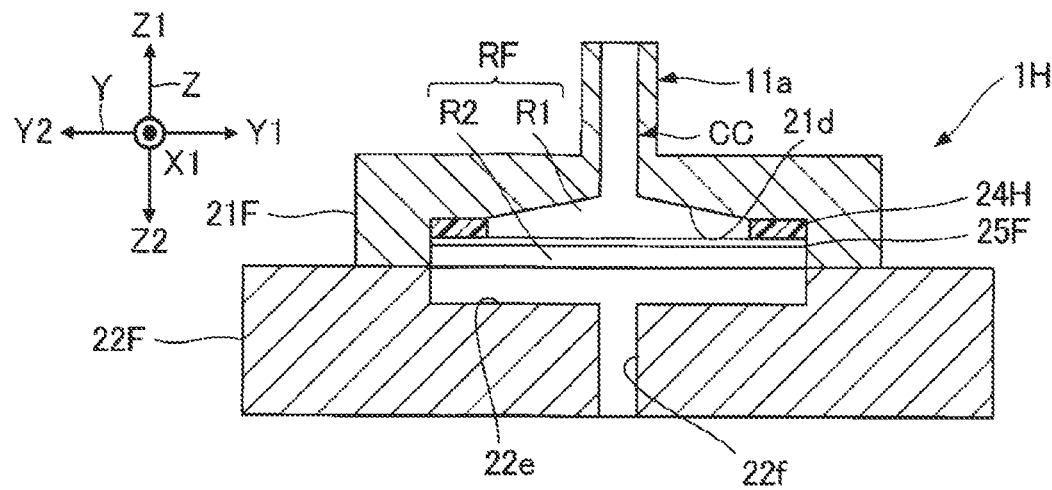
FIG. 24 is a sectional view of a flow passage member according to a third variation example.

FIG. 24 is a sectional view of a flow passage member 1H according to a third variation example. The flow passage member 1H is the same as the flow passage member 1F according to the first variation example described earlier except that the filter 25F is fixed indirectly to the layer 21F by means of a fixing member 24H disposed therebetween. That is, the flow passage member 1H includes the layer 21F, which is an example of "a first member", the layer 22F, which is an example of "a second member", the fixing member 24H, and the filter 25F.

The fixing member 24H is made of thermoplastic resin and has a frame shape. The fixing member 24H is fixed to the layer 21F with an adhesive that is not illustrated. The filter 25F is fixed to the fixing member 24H by welding, etc., without using an adhesive. Even when configured as in the third variation example described above, the same effects as those of the foregoing exemplary embodiments, or similar effects, can be obtained. The fixing member 24H may be made of thermosetting resin if the fixing member 24H is molded integrally with the filter 25F by insert molding such that the peripheral portion of the filter 25A is embedded in the fixing member 24H as in the foregoing sixth embodiment.

7-4. Fourth Variation Example

Figure 25:
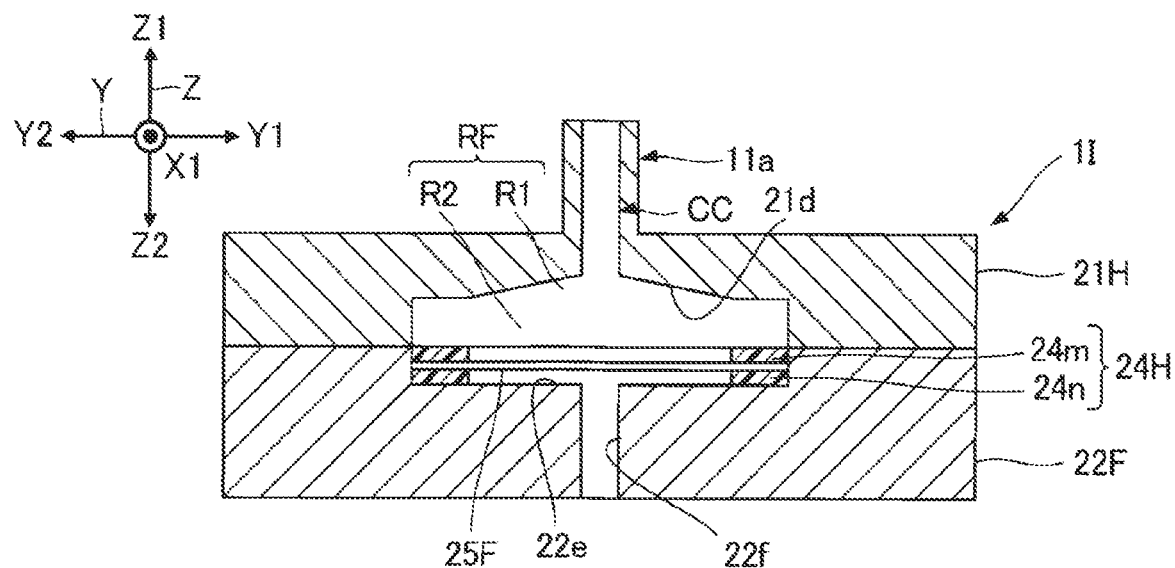
FIG. 25 is a sectional view of a flow passage member according to a fourth variation example.

FIG. 25 is a sectional view of a flow passage member 1I according to a fourth variation example. The flow passage member 1I includes a layer 21H, which is an example of "a second member", the layer 22F, which is an example of "a first member", the fixing member 24H, and the filter 25F. The layers 21H and 22F constitute a stack of layers in this order as viewed toward Z2 and are fixed to each other with an adhesive. Each of the layers 21H and 22F is made of thermosetting resin, metal, or ceramic.

The filter 25F is disposed inside a space formed between the layer 21H and the layer 22F. The layer 21H has the recess 21d that is provided in its surface facing in the Z2 direction. The layer 22F has the recess 22e that is provided in its surface facing in the Z1 direction. The recess 21d and the recess 22e constitute the filter chamber RF. The fixing member 24H and the filter 25F are disposed inside the recess 22e. The filter 25F is fixed indirectly to the layer 22F by means of the fixing member 24H.

In this variation example, the fixing member 24H has a stack structure made up of two members 24m and 24n. Both of the members 24m and 24n are made of thermoplastic resin. The members 24m and 24n are bonded to each other, and to the filter 25F, by laser welding or ultrasonic welding, etc. When laser welding is used, one of the members 24m and 24n is made of light-transmissive resin, and the other is made of light-absorbing resin. Even when configured as in the fourth variation example described above, the same effects as those of the foregoing exemplary embodiments, or similar effects, can be obtained.

7-5. Fifth Variation Example

In the foregoing exemplary embodiments, cases where the liquid ejecting head 10 is configured as a line head have been described for the purpose of presenting examples. However, the scope of the present disclosure is not limited to the foregoing examples. The concept of the present disclosure may be applied to a serial-type configuration in which the liquid ejecting head 10 is reciprocated along the X axis.

7-6. Sixth Variation Example

The liquid ejecting apparatus 100 disclosed as examples in the foregoing exemplary embodiments can be applied to not only print-only machines but also various kinds of equipment such as facsimiles and copiers, etc. The scope of application of a liquid ejecting apparatus according to the present disclosure is not limited to printing. For example, a liquid ejecting apparatus that ejects a colorant solution can be used as an apparatus for manufacturing a color filter of a liquid crystal display device. A liquid ejecting apparatus that ejects a solution of a conductive material can be used as a manufacturing apparatus for forming wiring lines and electrodes of a wiring substrate.

What is claimed is:

1. A flow passage member, comprising:
   a supply flow passage through which liquid flows;
   a filter provided on a path of the supply flow passage, the liquid being configured to pass through the filter;
   a fixing member which constitutes a part of the supply flow passage and on which the filter is fixed; and
   a first member which constitutes a part of the supply flow passage and on which the fixing member is fixed; wherein
   the fixing member is made of thermoplastic resin, and
   the first member is made of any of thermosetting resin, metal, and ceramic, wherein
   only one filter is fixed to the fixing member, and
   in a plan view, an area size of the fixing member is smaller than an area size of the first member, where the plan view is a view in a direction in which the first member and the fixing member overlap each other.

2. The flow passage member according to claim 1, wherein
   the fixing member and the filter are fixed to each other by welding, and
   the fixing member and the first member are fixed to each other with a first adhesive.

3. The flow passage member according to claim 2, wherein
   the fixing member is a member that has optical transparency, and
   the first adhesive is a photo-curable adhesive.

4. The flow passage member according to claim 1, wherein
   no adhesive sticks to the filter.

5. The flow passage member according to claim 1, further comprising:
   a second member constituting a part of the supply flow passage and made of any of thermosetting resin, metal, and ceramic; wherein
   the fixing member is disposed between the first member and the second member.

6. The flow passage member according to claim 5, wherein
   In plan view, an area size of the fixing member is smaller than an area size of the second member.

7. The flow passage member according to claim 5, wherein
   the fixing member and the second member are fixed to each other with a second adhesive.

8. The flow passage member according to claim 1, wherein
   the fixing member is a frame member.

9. The flow passage member according to claim 1, wherein
   the fixing member has a recess that is recessed from a surface to which the filter is fixed, and
   a bottom surface of the recess constitutes a part of the supply flow passage and has a through hole.

10. The flow passage member according to claim 1, wherein
    the supply flow passage includes a flow passage extending in a direction intersecting with a stack direction of the first member and the filter, and
    the flow passage is provided in the first member.

11. The flow passage member according to claim 1, wherein
    the supply flow passage includes a branch flow passage branching off therefrom, and
    the branch flow passage is provided in the first member.

12. A flow passage member, comprising:
    a supply flow passage through which liquid flows;
    a filter provided on a path of the supply flow passage, the liquid being configured to pass through the filter;
    a fixing member constituting a part of the supply flow passage and made of thermosetting resin; and
    a first member constituting a part of the supply flow passage and made of any of thermosetting resin, metal, and ceramic; wherein
    the filter is molded integrally on the fixing member by insert molding, the fixing member is fixed on the first member with an adhesive, and only one filter is fixed to the fixing member, and in a plan view, an area size of the fixing member is smaller than an area size of the first member, where the plan view is a view in a direction in which the first member and the fixing member overlap each other.

13. A liquid ejecting head, comprising:

the flow passage member according to claim 1; and a nozzle configured to eject the liquid passing through the supply flow passage.

14. The liquid ejecting head according to claim 13, wherein the liquid flowing through the supply flow passage is ultraviolet ray curing ink or solvent ink.

15. The liquid ejecting head according to claim 13, further comprising:

a circulation flow passage through which the liquid that was not ejected from the nozzle after passing through the supply flow passage flows; wherein the first member constitutes a part of the circulation flow passage.

16. A liquid ejecting apparatus, comprising:

the liquid ejecting head according to claim 13; and a liquid container that contains the liquid that is to be supplied to the liquid ejecting head.

17. The flow passage member according to claim 1, wherein the filter and the fixing member are fixed to the first member with first adhesives.

18. The flow passage member according to claim 5, wherein the first member and the second member are bonded to each other with adhesive and constitute a space that accommodates the fixing member.

19. The flow passage member according to claim 1, wherein the fixing member includes an outer peripheral and an inner portion to which the filter is fixed, the outer peripheral of the fixing member is fixed to the first member with a first adhesive.

* * * * *